(12) United States Patent
Cornolti et al.

(10) Patent No.: US 9,285,003 B2
(45) Date of Patent: Mar. 15, 2016

(54) DISC BRAKE CALIPER WITH PISTON ROLL-BACK DEVICE

(75) Inventors: Raffaello Cornolti, Bergamo (IT); Alberto Previtali, Bergamo (IT); Luca Gelfi, Bergamo (IT)

(73) Assignee: FRENI BREMBO S.p.A., Curno, Bergamo (IT)

( * ) Notice: Subject to any disclaimer, the term of this patent is extended or adjusted under 35 U.S.C. 154(b) by 537 days.

(21) Appl. No.: 13/518,397

(22) PCT Filed: Dec. 23, 2010

(86) PCT No.: PCT/IB2010/056061
§ 371 (c)(1),
(2), (4) Date: Oct. 26, 2012

(87) PCT Pub. No.: WO2011/077410
PCT Pub. Date: Jun. 30, 2011

(65) Prior Publication Data
US 2013/0037357 A1    Feb. 14, 2013

(30) Foreign Application Priority Data

Dec. 24, 2009  (IT) .............................. MI2009A2300

(51) Int. Cl.
| F16D 55/22 | (2006.01) |
| F16D 65/14 | (2006.01) |
| F16D 125/06 | (2012.01) |
| F16D 127/02 | (2012.01) |

(52) U.S. Cl.
CPC ............ *F16D 65/14* (2013.01); *F16D 2125/06* (2013.01); *F16D 2127/02* (2013.01)

(58) Field of Classification Search
USPC ............................... 188/72.3, 72.4, 72.5, 370
See application file for complete search history.

(56) References Cited

U.S. PATENT DOCUMENTS

| 2,746,254 | A | * | 5/1956 | Lucien ............................... 92/51 |
| 2,817,419 | A | * | 12/1957 | Wolf ............................. 188/71.8 |
| 3,032,144 | A | * | 5/1962 | Stanton ........................ 188/71.8 |
| 3,064,768 | A | * | 11/1962 | Dotto ............................ 188/370 |
| 3,277,983 | A | * | 10/1966 | Jeffries ...................... 188/196 P |
| 3,582,093 | A | * | 6/1971 | Lucien .......................... 277/434 |
| 3,773,148 | A | * | 11/1973 | Jean-Claude et al. ........ 188/72.4 |
| 3,887,042 | A | * | 6/1975 | Ditlinger et al. .............. 188/71.8 |
| 4,179,131 | A | * | 12/1979 | Nussbaumer ................. 277/468 |
| 4,334,597 | A | * | 6/1982 | Tovagliaro ................... 188/71.8 |
| 4,336,746 | A | * | 6/1982 | Morith ........................ 92/130 B |
| 4,373,614 | A | * | 2/1983 | Runkle ........................ 188/72.3 |
| 4,386,682 | A | * | 6/1983 | Woo et al. .................... 188/71.8 |
| 4,576,386 | A |   | 3/1986 | Benson et al. |
| 4,815,359 | A | * | 3/1989 | Black .............................. 92/13.1 |
| 4,889,351 | A | * | 12/1989 | Frost ............................. 277/460 |
| 6,347,689 | B1 | * | 2/2002 | Ohishi .......................... 188/72.4 |
| 2003/0024777 | A1 |   | 2/2003 | Kurimoto et al. |
| 2004/0026194 | A1 | * | 2/2004 | Cortinovis ................ 188/218 A |

(Continued)

FOREIGN PATENT DOCUMENTS

| DE | 1130310 B | 5/1962 |
| DE | 8812936 U1 | 2/1990 |
| DE | 19860621 A1 | 7/2000 |
| DE | 10012358 A1 | 9/2001 |
| DE | 10215935 A1 | 10/2003 |
| DE | 202004014009 U1 | 11/2004 |
| EP | 0140549 A1 | 5/1985 |

(Continued)

*Primary Examiner* — Robert A Siconolfi
*Assistant Examiner* — James Hsiao
(74) *Attorney, Agent, or Firm* — Robert E. Alderson, Jr.

(57) ABSTRACT

Disc brake calipers with a piston roll-back device capable of allowing accurate and repeatable roll-back of pistons and which are easy to construct and assemble are provided.

21 Claims, 23 Drawing Sheets

(56) References Cited

U.S. PATENT DOCUMENTS

2009/0145701 A1* 6/2009 Piccoli et al. ............... 188/71.8
2009/0255769 A1* 10/2009 Kurita ............................ 188/370
2010/0096221 A1* 4/2010 Vezzoli et al. ............... 188/72.3

FOREIGN PATENT DOCUMENTS

| GB | 2282648 A | 4/1995 |
| JP | 7253128 A | 10/1995 |
| WO | 2008093161 A1 | 8/2008 |

* cited by examiner

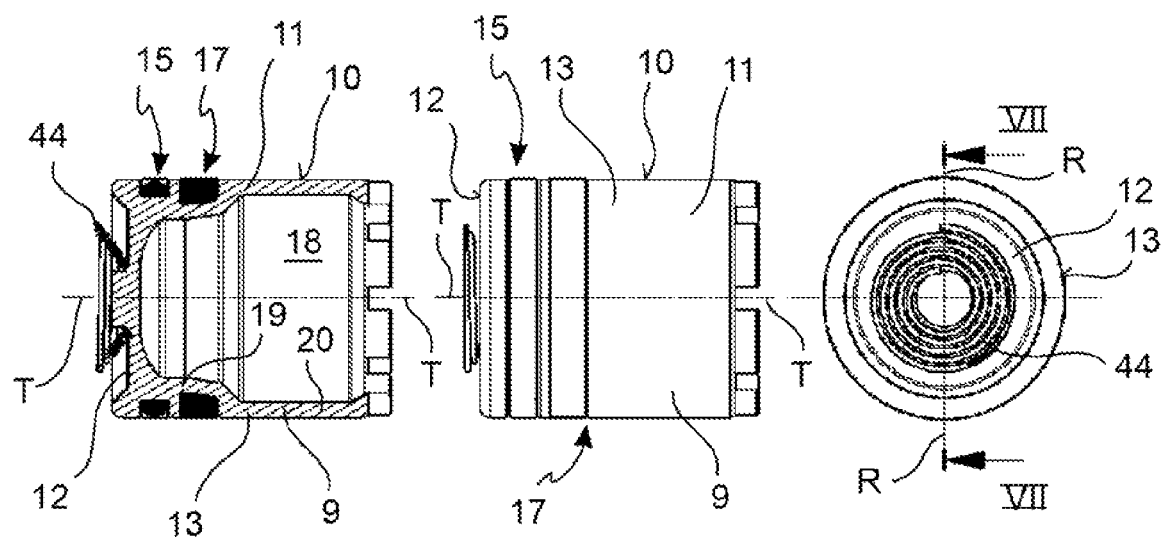

DISC BRAKE CALIPER WITH PISTON ROLL-BACK DEVICE

CROSS-REFERENCE TO RELATED APPLICATIONS

This application is a National Phase Application of PCT International Application No. PCT/IB2010/056061, International Filing Date, 23 Dec. 2010, claiming priority to Italian Patent Application No. MI2009A002300, filed 24 Dec. 2009, both of which are hereby incorporated by reference in their entirety.

FIELD OF THE INVENTION

The present invention refers to a disc brake caliper of the type comprising a body arranged astride a brake disc with a roll-back device for pistons operating in said brake caliper. Said disc comprises a rotational axis and opposite friction surface. Pads are received in said caliper body so as to be slidable in the direction axial to the disc to respectively operate on the opposite friction surface. Said caliper body further comprises at least one seat adapted to sealingly receive a piston, in turn adapted to impact at least one of said pads against le friction surfaces of the disc, when said piston is pressed towards said pads by a pressurised brake fluid.

In particular, the piston roll-back device allows returning—by a predetermined amount—the piston into the seat of the caliper body upon termination of the pressure exerted thereonto by the brake fluid, preventing the pads from exerting a residue unwanted braking action, or residue braking torque, on the disc even when pressure is not applied in the braking system which is controlled by the driver of the vehicle.

BACKGROUND OF THE INVENTION

Use of a gasket operating on the piston as a roll-back element of the latter is known from JP10292834, U.S. Pat. No. 6,044,936, U.S. Pat. No. 4,387,901, U.S. Pat. No. 3,421,604, U.S. Pat. No. 3,377,076 and EP0092896 A1.

This gasket is received in a seat of the surface of the piston seat or cylinder and presses on the piston so as to be deformed in the movement direction of the piston remaining with a surface at contact with the piston while the latter moves pressed by the pressurised brake fluid. Upon termination of the brake fluid pressure on the piston, the gasket deformed elastically and axially by the piston returns to the initial shape drawing the piston into the cylinder.

Should the pad impacted by the piston wear out during the braking action beyond the deformation limit of the gasket, the piston starts sliding with respect to the deformed gasket compensating the degree of wear of the pad. Upon termination of the braking action, the piston is returned by the gasket solely by the degree proportional to the deformation thereof.

Though satisfactory from various points of view, these known piston roll-back devices reveal inherent operation variability related to the fact that the gasket performs the double function of providing sealing between cylinder and piston and serving as an elastic element for the roll-back of the piston. The elastic roll-back is thus disturbed by the pressure of the brake fluid operating on the piston to an extent of the roll-back not being deemed constant over time. Furthermore the vicinity of the gasket to the source of heat which is generated by the friction between the disc and pad causes an unwanted temperature rise of the brake fluid with ensuing possible formation of vapour bubbles in the fluid. The high temperature can also cause a quick deterioration of the physical features of the material constituting the gasket thus leading—also in this case—to a high operation variability of the piston roll-back device.

Use of elastic means operating between two components constituting the piston to determine the roll-back thereof is known from WO07057929.

The device includes a piston comprising a piston body and a sleeve coaxial to said piston body, a scraper element received in a seat provided in the caliper body so as to press against the surface of the sleeve, elastic means being provided between said sleeve and said piston body. When the piston is pressed exiting from the seat thereof, it leads to a compression of the elastic means. Upon termination of the brake fluid pressure, the elastic means bring the piston body to an abutment position against the sleeve thus determining the roll-back of the piston by a predetermined degree.

This known piston roll-back device is more complex construction-wise due to the presence of several pieces constituting the piston and hence entailing a more difficult assembly.

Document WO00169102 shows a piston roll-back device similar to the previous WO07057929 wherein the seats of the gaskets operating on the cylinder are provided in the piston. Also in this case the complexity of the device entails difficult machining of the elements constituting the piston as well as a complex assembly thereof.

SUMMARY OF THE INVENTION

An object of the present invention is to provide a disc brake caliper with a piston roll-back device capable of overcoming the drawbacks of the prior art and in particular of obtain a device capable of allowing the accurate and repeatable roll-back of the pistons and which is simultaneously easy to construct and assemble.

This object is attained by a brake caliper piston roll-back device as described in claim 1.

According to a general embodiment, a disc brake caliper comprises a caliper body which is arranged astride a brake disc.

This brake disc has a rotational axis which defines an axial direction. The brake disc is provided with friction surfaces opposite with respect to each other on which pads received in the caliper so as to be slidable substantially in axial direction operate. Said caliper body comprises at least one piston seat which is adapted to receive a piston provided with lateral surfaces cooperating with the piston seat so as to be pushed by a pressurised brake fluid exiting from said piston seat to impact at least one of said pads against one of said friction surfaces of the brake disc.

Advantageously, said piston has a substantially cylindrical-shaped piston body having an axis whose symmetry, or thrust axis, is substantially arranged parallel to the rotational axis of the disc. Said piston body also has a radial direction arranged perpendicular to said thrust axis.

According to an embodiment, said piston body is made compact or, in other words, in a single piece, for example due to the fact that it is obtained through machining operations by removing chips from a rod or it is obtained through a single casting subsequently machined to remove chips or it is also obtained through forging or drawing operations. According to an embodiment, said piston body is also provided using several parts which are however assembled and fastened to each other in a non-removable manner.

Preferably, said piston body has a bottom adapted to face the bottom of the piston seat provided in the caliper body and adapted to receive the thrust of the brake fluid.

According to an embodiment, said piston body also has a cylindrical wall projecting from said bottom towards at least one pad.

According to an embodiment, said piston body has a first annular seat provided in said cylindrical wall in a position thereof in which it is at least partly superimposed in a direction radial to the bottom wall of the piston. Said first annular seat receives a gasket which operates between said piston and the piston seat thereof, so as to provide a fluid sealing adapted to prevent the leakage of the brake fluid from the caliper body.

According to an embodiment, said gasket is received in said first annular seat so as to substantially prevent any deformation thereof in the direction parallel to the thrust axis during the operation of the piston, between piston and piston seat.

According to an embodiment, the first gasket is received in said first seat so to prevent any relevant axial deformation or elastic deformation thereof in the direction of the thrust axis, hindering it from exerting any substantially relevant contribution to the roll-back or elastic return of the piston into the piston seat.

According to an embodiment said piston body also has a second annular seat which is arranged in said cylindrical wall. This second annular seat is different from the first annular seat and it is arranged on the side opposite to the bottom of the piston with respect to said first annular seat.

According to an embodiment, this second annular seat receives a second gasket.

Advantageously, this second annular seat has a shape adapted to allow a controlled elastic deformation of said second gasket. According to an embodiment, said second annular seat has a shape adapted to allow a controlled elastic deformation of the second gasket in a direction parallel to the thrust axis.

Advantageously, said second annular seat receives the gasket so that the latter is enabled to press between the piston and the piston seat, and plastic deformation thereof is allowed in the direction of the thrust axis so as to adapt to the shape of said second annular seat during the relative movement of the piston with respect to the piston seat, and so that it is pre-loaded elastically to return the piston into the piston seat by a predetermined degree or roll-back upon termination of the braking action.

Further characteristics and advantages of the device according to the invention shall be clear from the following description of the preferred embodiments thereof, solely provided by way of non-limiting example, with reference to the attached drawings, wherein:

BRIEF DESCRIPTION OF THE FIGURES

FIG. 7 represents a cross-section of a piston according to the line VII-VII of FIG. 9;

FIG. 8 represents a radial view of the piston of FIG. 7;

FIG. 9 represents a bottom view of the piston of FIG. 7;

DETAILED DESCRIPTION

Figure 1:
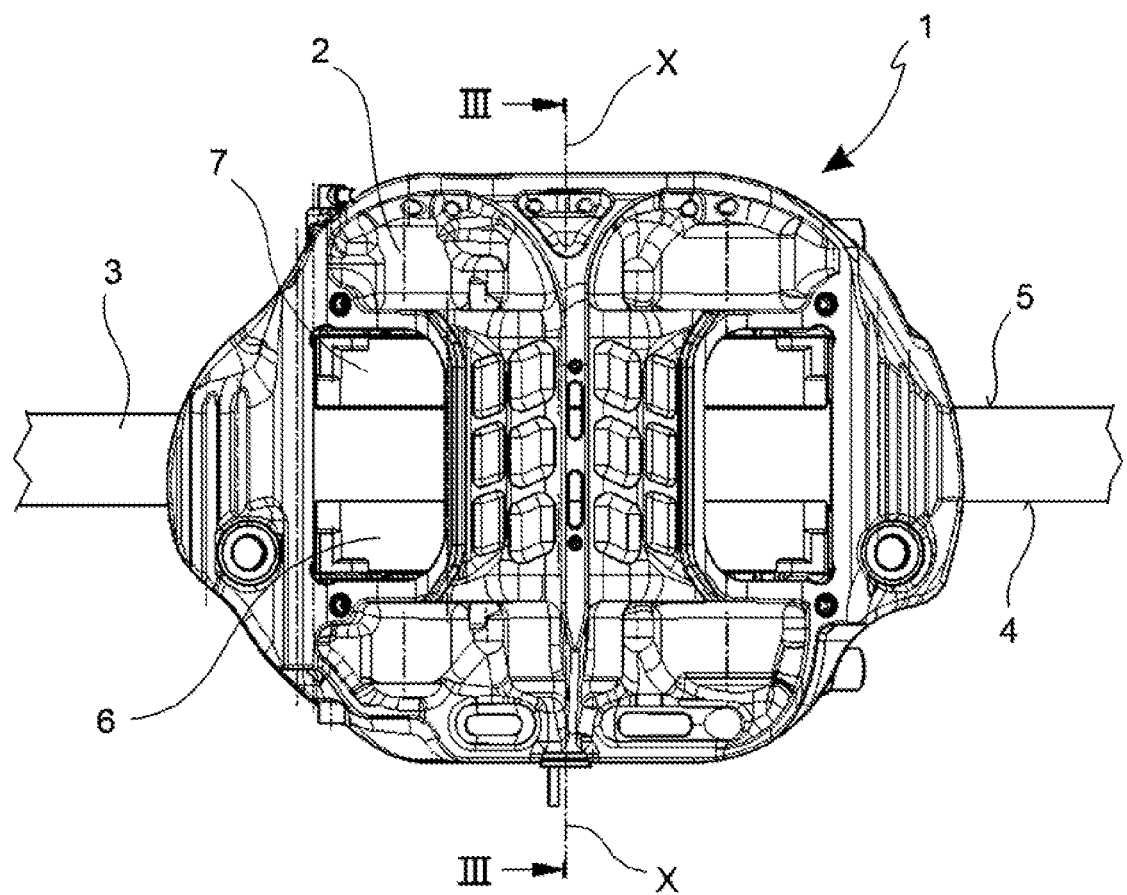
FIG. 1 represents an orthogonal projection view, facing towards axis of the disc, of a brake caliper.
Figure 2:
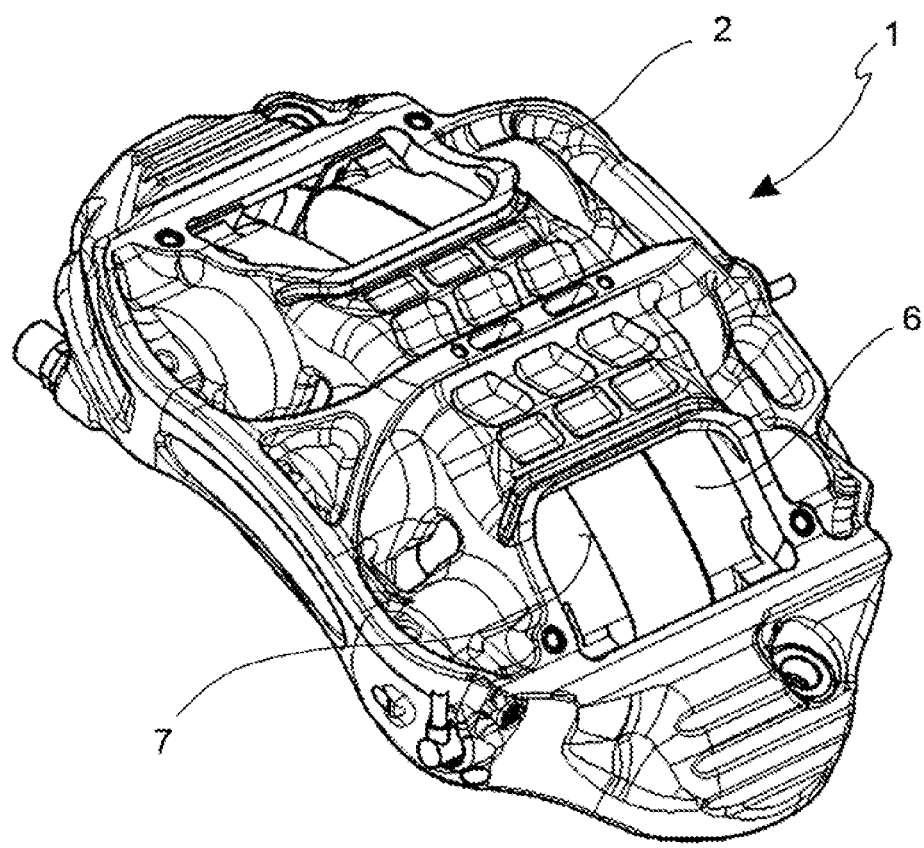
FIG. 2 represents an elevation view of the brake caliper of FIG. 1.
Figure 3:
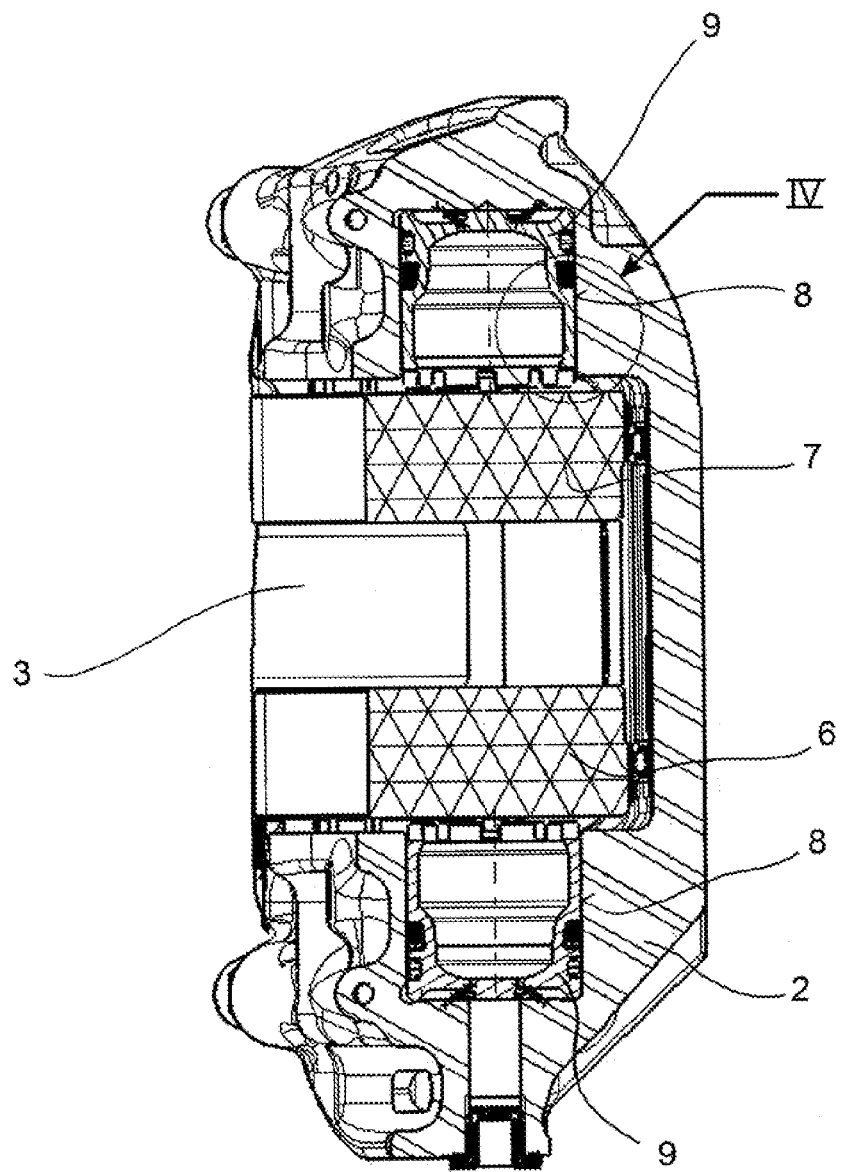
FIG. 3 represents a cross-section along the line III-III of the brake caliper of FIG. 1.
Figure 4:
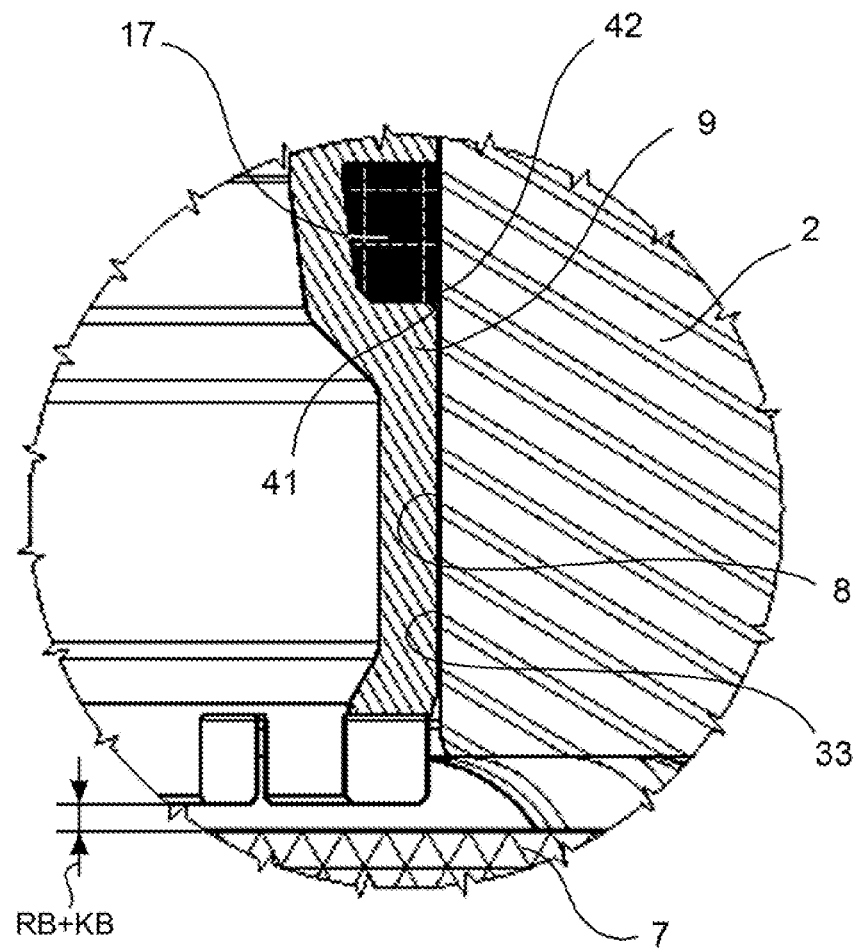
FIG. 4 represents the cross-sectional detail of a cylinder device and brake caliper piston indicated with reference IV in FIG. 3.
Figure 5:
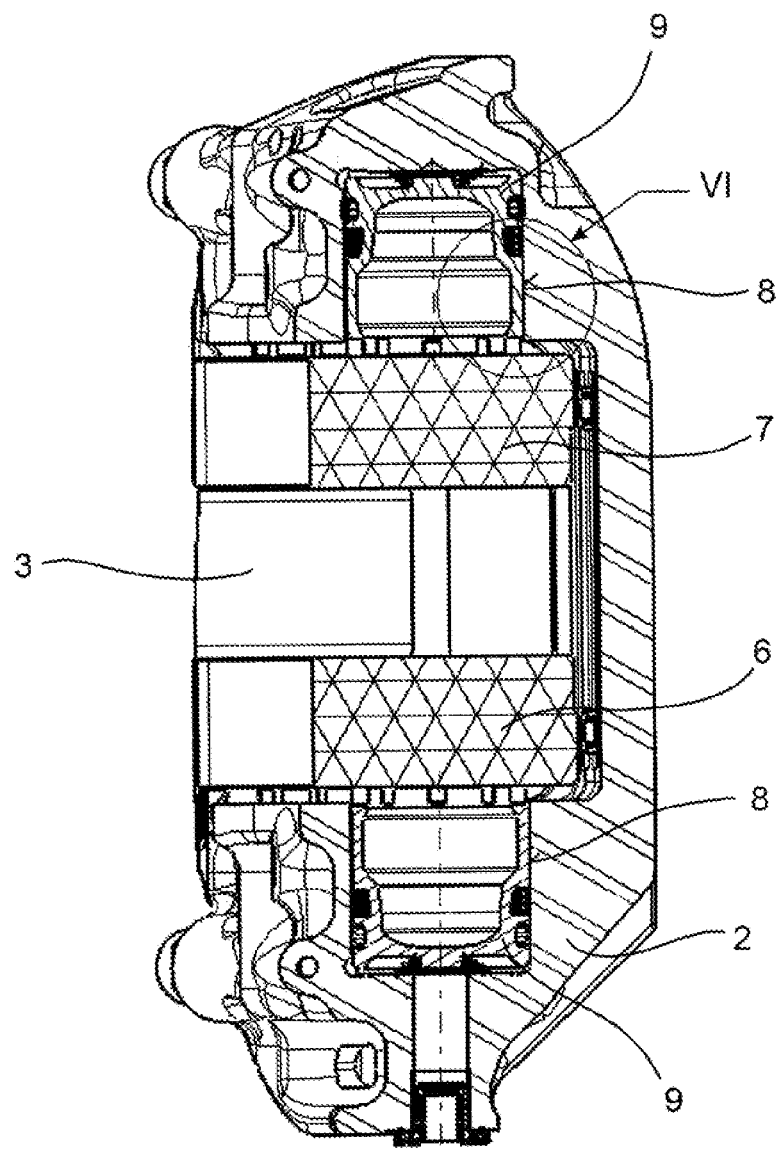
FIG. 5 represents a cross-section along the line III-III of the brake caliper of FIG. 1 wherein the piston is represented in a different operation condition with respect to the FIG. 3.
Figure 6:
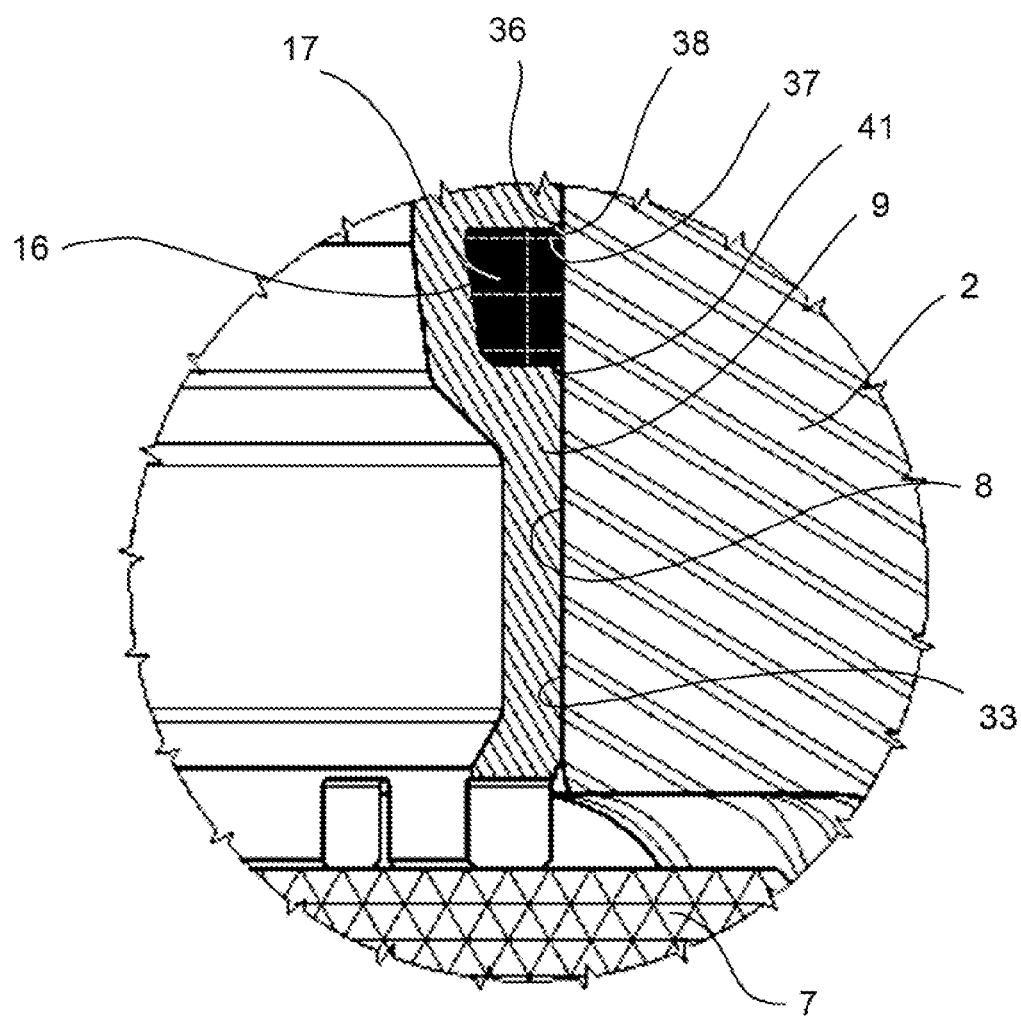
FIG. 6 represents the cross-sectional detail of a cylinder device and piston of a brake caliper indicated with VI in FIG. 5.
Figure 10:
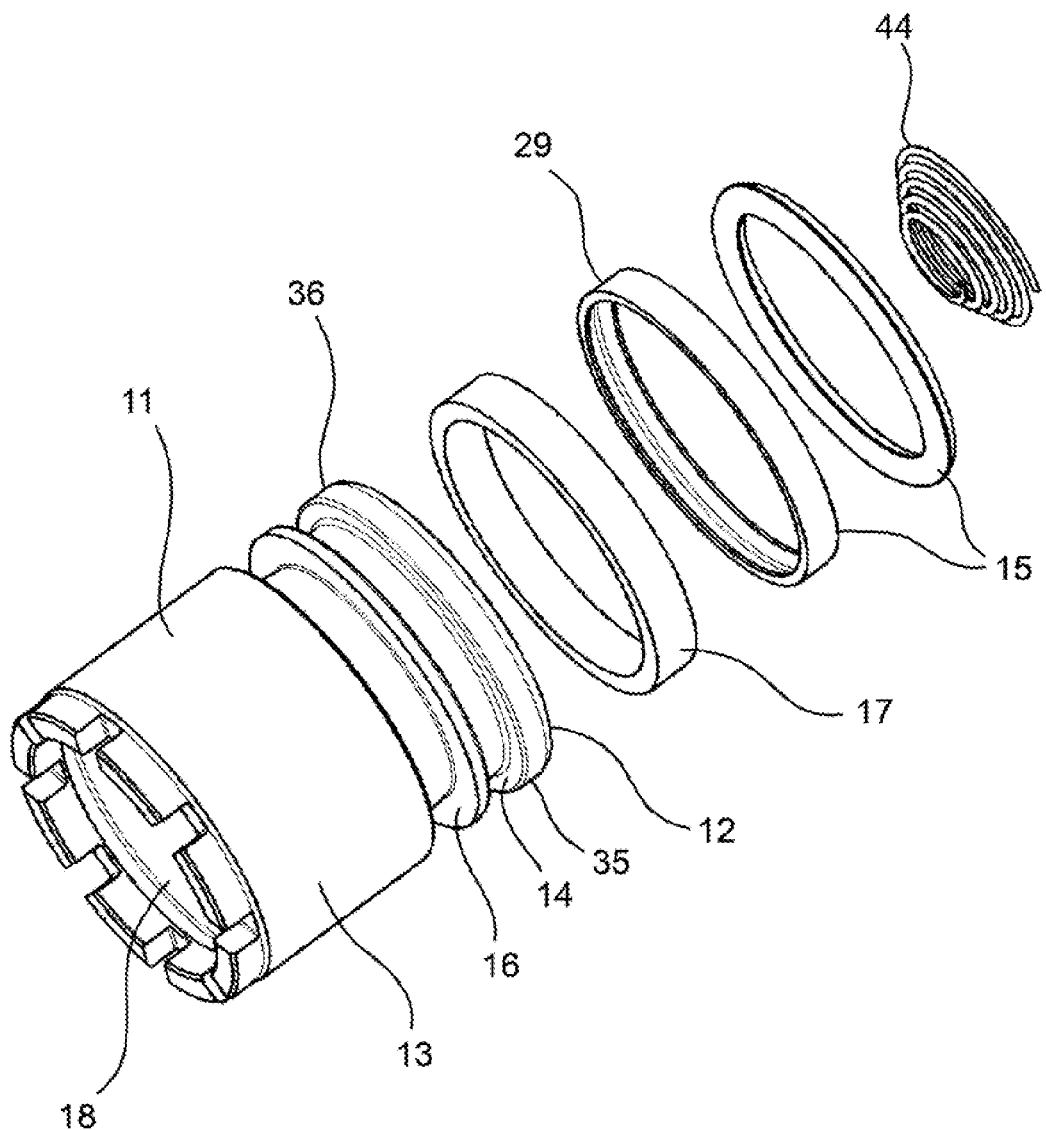
FIG. 10 represents an axonometric view of a brake caliper piston with parts separated.
Figure 11:
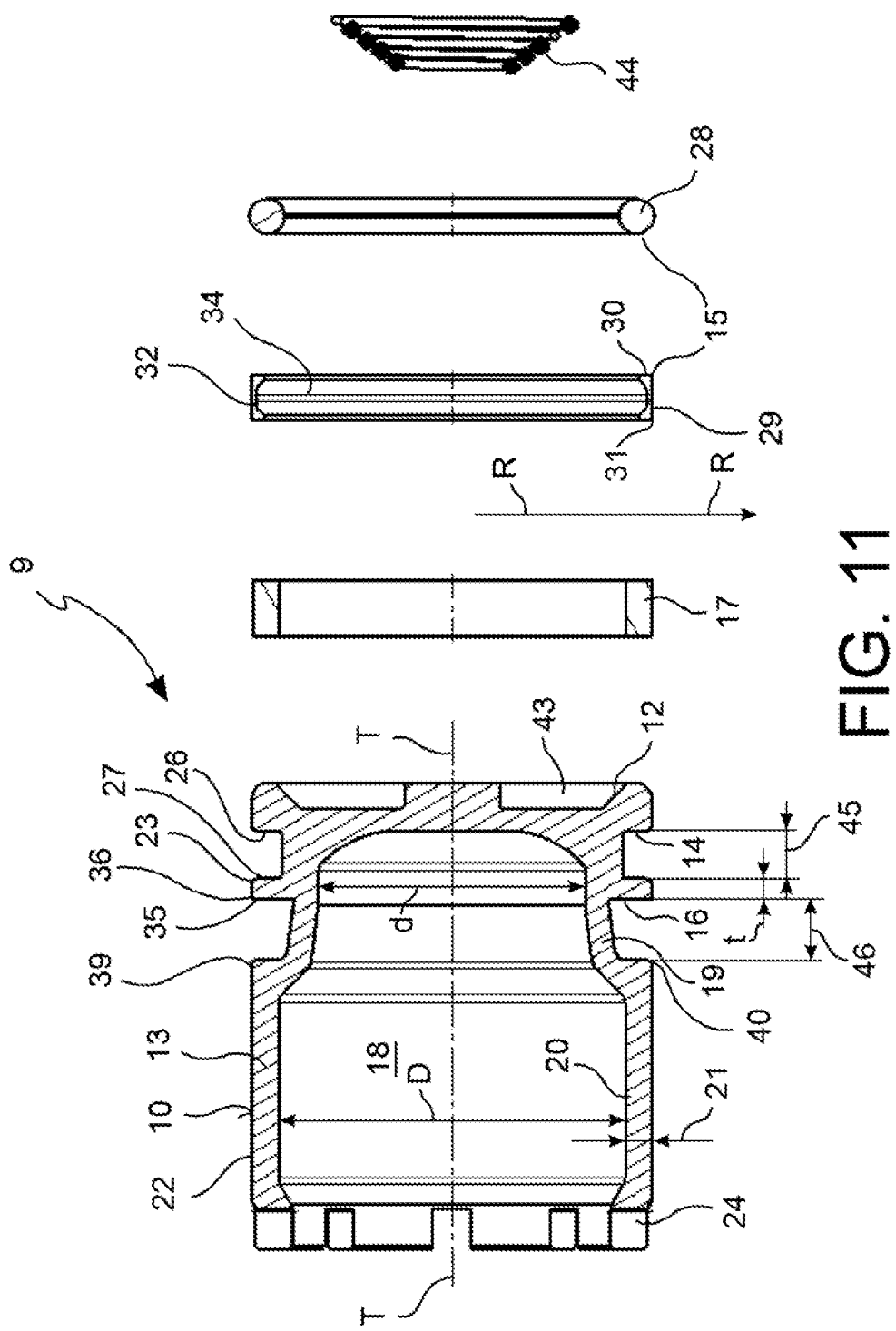
FIG. 11 represents a cross-sectional orthogonal view along a plane passing through the piston thrust axis of the piston of FIG. 10.

Hereinafter, reference shall be made to "axial direction" or "thrust direction" to indicate a direction substantially parallel to the rotational axis of the associable brake disc; to "thrust axis" to indicate an axis substantially parallel to the rotational axis of the associable disc; to "radial direction" to indicate a direction substantially perpendicular to the rotational axis of the brake disc; to "extraction" or "advancement" or "exit" to indicate the travel direction of the piston exiting from the seat thereof provided in the caliper body; to "roll-back" or "return" or "recession" to indicate the travel direction of the piston entering into the seat thereof provided in the caliper body; to "knock back" to indicate the travel direction of the piston exiting from the seat thereof provided in the caliper body due to a device exerting an action different from that of the brake fluid; to "edge" to indicate the point where two faces of a solid join.

According to a general embodiment of a brake caliper with a piston roll-back device, the brake caliper 1 comprises a caliper body 2 arranged astride a brake disc 3 having a rotational axis X-X and opposite friction surfaces 4, 5. The brake caliper 1 receives pads 6, 7 in the caliper body 2 so as to allow sliding thereof in direction X-X axial to the brake disc 3 and an action thereof on said opposite friction surfaces 4, 5.

According to an embodiment, said caliper body 2 comprises at least one piston seat 8 adapted to receive a piston 9 provided with a lateral surface 10 adapted to slide in said piston seat 8 so as to be pushed by a pressurised brake fluid exiting from said seat to impact at least one of said pads 6, 7 against one of said friction surfaces 4, 5 of the brake disc 3.

According to an embodiment, said piston 9 has a substantially cylindrical-shaped piston body 11 having a thrust axis T-T substantially parallel to the rotational axis X-X of the disc and having a radial direction R-R perpendicular to said thrust axis T-T.

According to an embodiment, said piston body 11 of said piston is a single piece.

According to an embodiment, said piston body has a bottom 12 and a cylindrical wall 13.

According to an embodiment, said piston body 11 has a first annular seat 14 provided in said cylindrical wall 13 and at least partly radially superimposed on said bottom 12.

According to an embodiment, said first annular seat 14 receives a first gasket 15 which operates between said piston 9 and said piston seat 8 so as to provide a fluid sealing which allows pressurising the fluid, also preventing the leakage of the brake fluid.

According to an embodiment, said first gasket 15 is received in said first annular seat 14 so that any deformation thereof is prevented in the direction parallel to the thrust axis T-T during the operation of the piston, between the piston and piston seat.

According to an embodiment, said piston body 11 has a second annular seat 16 arranged in said cylindrical wall 13.

Advantageously, said second seat 16 is different from said first seat 14 and it is arranged on the side opposite to the bottom 12 with respect to said first seat 14. In other words, said second seat 16 is arranged nearest the pads of said first seat 14.

According to an embodiment, said second annular seat 14 receives a second gasket 17 and it has a shape adapted for a controlled elastic deformation of said gasket 17.

According to an embodiment, said second gasket 17 operates between said piston 9 and said piston seat 8 and it is adapted to be deformed elastically in the direction of the thrust axis T-T, adapting to the shape of said second annular seat 14 during the relative movement of the piston 9 with respect to the piston seat 8 so as to be preloaded elastically and return the piston 9 into the piston seat 8 by a predetermined degree, or roll-back RB, upon termination of the braking action.

According to an embodiment, said piston body 9 comprises an internally hollow portion 18. According to an embodiment, said piston body is substantially shaped as a drinking glass delimiting an internal cavity. Advantageously, said internally hollow portion 18 has dimensions transverse to the thrust axis T-T increasing starting from said bottom 12.

According to an embodiment, said hollow portion 18 is preferably made up of two portions 19, 20 whose first portion 19 is arranged near the bottom 12 and has dimensions, calculated transversely to the thrust axis T-T, smaller with respect to the dimensions, calculated transversely to the thrust axis T-T, of the second portion 20.

According to an embodiment, said cylindrical wall 13 has a substantially constant radial thickness 21.

According to an embodiment, said cylindrical wall 13 comprises two portions 22, 23 whose first portion 22 serves as a spacer between the pad 6, 7 and said annular seats 14, 16 while the second portion 23, arranged further from the pad 6, 7 is such to create a structure adapted to receive the gaskets 15, 17.

According to an embodiment, a first portion 22 of the cylindrical wall 13 comprises lightening means 24.

According to an embodiment, a first portion 22 of the cylindrical wall 13 comprises lightening holes 25.

According to an embodiment, a first portion 22 of the cylindrical wall 13 comprises longitudinal lightening grooves 46.

According to an embodiment, said second annular seat 16 is arranged in a portion 23 of the cylindrical wall 13 arranged superimposed on a second portion 20 of the hollow portion 18 having smaller diameters with respect to a remaining first portion 19 of the hollow portion 18.

According to an embodiment, said first annular seat 14 comprises two lateral faces 26, 27 arranged perpendicular to the thrust direction T-T.

According to an embodiment, said first gasket 15 preferably comprises an "o-ring" gasket 28 coupled to a retention ring 29, both received in said first annular seat 14, and wherein said retention ring 29 comprises opposite lateral walls 30, 31 cooperating with lateral faces 26, 27 of said first annular seat 14.

According to an embodiment, said first gasket 15 comprises a retention ring 29 having a surface 32, opposite to the annular seat 14, adapted to provide a fluid sealing by cooperating with the inner sliding surface 33 of the piston seat 8.

According to an embodiment, said first gasket 15 comprises a retention ring 29 having a surface 34 facing an underlying gasket 28 and shaped so as to partly receive said gasket 28. According to an embodiment, said retention ring 28 has a surface 34 facing an "o-ring" gasket having an annular groove with a circle-arc-shaped cross-section.

According to an embodiment, said first gasket 15 comprises a retention ring 28 received in said first annular seat 14 so that it is substantially prevented from rotating around the radial direction R-R and moving along the thrust direction T-T.

According to an embodiment, said second annular seat 16 comprises in proximity of an edge 35, arranged nearest the bottom of the piston body, a rounding 36 which defines a volume 38 or chamber adapted to receive a gasket portion 37 during elastic deformation thereof determined by the movement of the piston 9 exiting from the piston seat 8.

According to an embodiment, said second gasket 17 is preferably substantially quadrangular-shaped.

According to an embodiment, said second annular seat 16 defines a volume 38 dimensioned to receive a portion or predefined amount 37 of gasket 17 so as to obtain the roll-back RB of the piston 9 into the piston seat thereof 8 by a predetermined desired amount.

According to an embodiment, said second annular seat 16 is spaced from said first annular seat 14 by a distance equivalent or lower than the width 45 of said first seat, when calculated along the thrust direction T-T.

According to an embodiment, said second annular seat 16 is spaced from said first annular seat 14 by a distance t equivalent or lower than the width 46 of said second seat 16, when calculated along the thrust direction T-T.

According to an embodiment, said second annular seat 16 comprises, in proximity of an edge thereof 39 farthest from the bottom 12 of the piston body, a second rounding 40 which is adapted to determine a knock back volume 41 to receive a portion 42 of gasket 17 during elastic deformation thereof determined by the movement of the piston 9 returning pressed into the piston seat thereof 8.

According to an embodiment, said second annular seat 16 defines a knock back volume 41 dimensioned to receive a predetermined portion 42 of gasket 17 so as to obtain a "knock-back" KB by a predetermined degree.

According to an embodiment, said bottom 12 of the piston body 11 comprises a bottom seat 43 adapted to receive an elastic element 44 which operates between the piston 9 and the piston seat 8 according to the thrust direction T-T.

According to an embodiment, said bottom 12 comprises a bottom seat 43 configured to enable the correct centring of said elastic element 44.

According to an embodiment, between said bottom 12 and said piston seat 8 there is preferably provided a spring 44 provided with an elastic constant substantially constant over the entire travel of exit of the piston 9 from the piston seat 8.

According to an embodiment, between said bottom 12 and said piston seat 8 there is present an elastic element 44 capable of guaranteeing a desired "knock-back" of the piston 9, also considering the possible knock-back action of the second gasket 17.

Due to the arrangement of the first annular seat, at least partly superimposed in radial direction to the bottom wall of the piston, the brake fluid can be kept far away from the pad and thus from one of the sources of heat that could alter the characteristics thereof, for example it could heat the brake fluid to boiling thus practically making the braking of the vehicle impossible.

Providing gaskets arranged far from source of heat caused by the pads also allows guaranteeing that the material thereof be less subjected to the deterioration of the chemical/physical properties thereof, thus avoiding the operation variability of the sealing and the elastic return of the piston into the piston seat, or roll-back, simultaneously guaranteeing the possibility of defining the roll-back so that it has a predefined and lower degree and simultaneously guaranteeing that these roll-back recessions are always constant or repetitive and reliable over time.

Figure 15A:
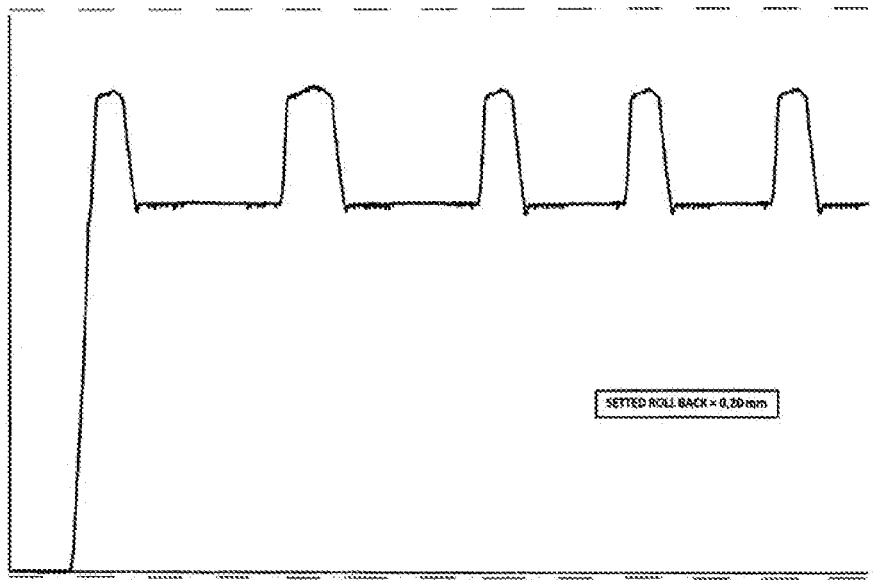
FIG. 15*a* illustrates a chart showing the return trend of the piston into the piston seat, or roll-back, as a function of time in five braking cycles.
Figure 15B:
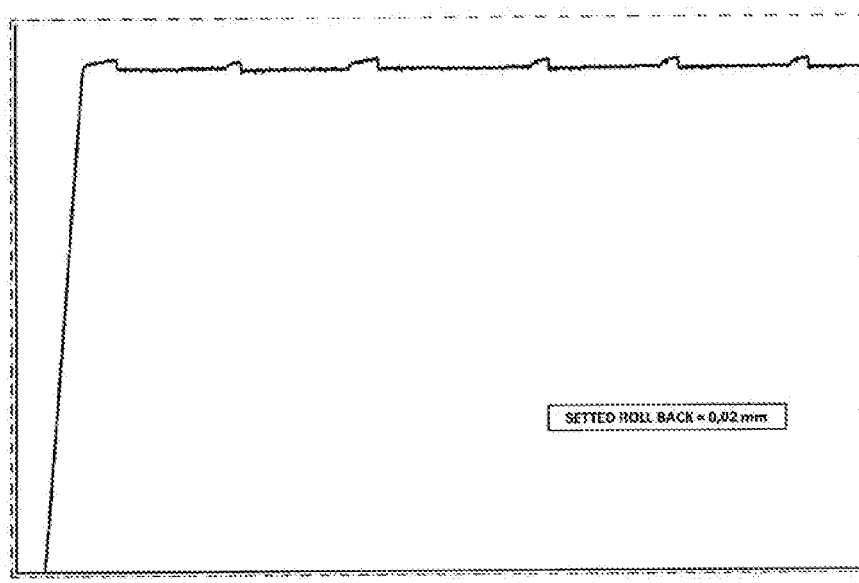
FIG. 15*b* illustrates a chart showing the return trend of the piston into the piston seat, or roll-back, as a function of time in five braking cycles wherein the roll-back was predetermined by a degree 10 times smaller with respect to FIG. 15*a*.

FIGS. 15*a* and 15*b* show the result of a test carried out by setting a roll-back of 0.2 mm and 0.02 mm. The charts represent the travel of the piston as a function of time and clearly show how the roll-back is accurate and especially extremely repetitive in five or six operation cycles, as well as reliable to an extent of allowing reducing the degree thereof to the advantage of an increased prompt braking.

Providing a roll-back with small degree but constant and repetitive over time allows using this device even in high performance vehicles where the driver desires to feel the actuation of the vehicle braking device extremely reactive to the control thereof. The reactivity of the braking device is also guaranteed by the fact that the piston should cover a small stroke to near the pad again after it has been returned during the previous braking by the roll-back device.

Figure 16:
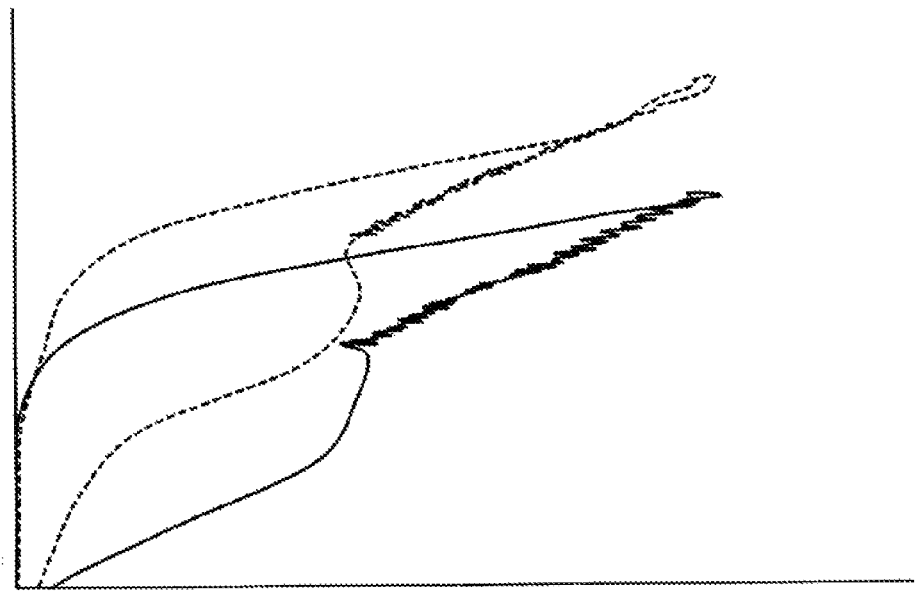
FIG. 16 illustrates a chart showing the comparison between a piston solution of the prior art with a piston solution as described herein, wherein the chart shows the travel of the brake pedal of a vehicle as a function of the braking torque exerted by the brake considering other conditions equivalent.
Figure 17:
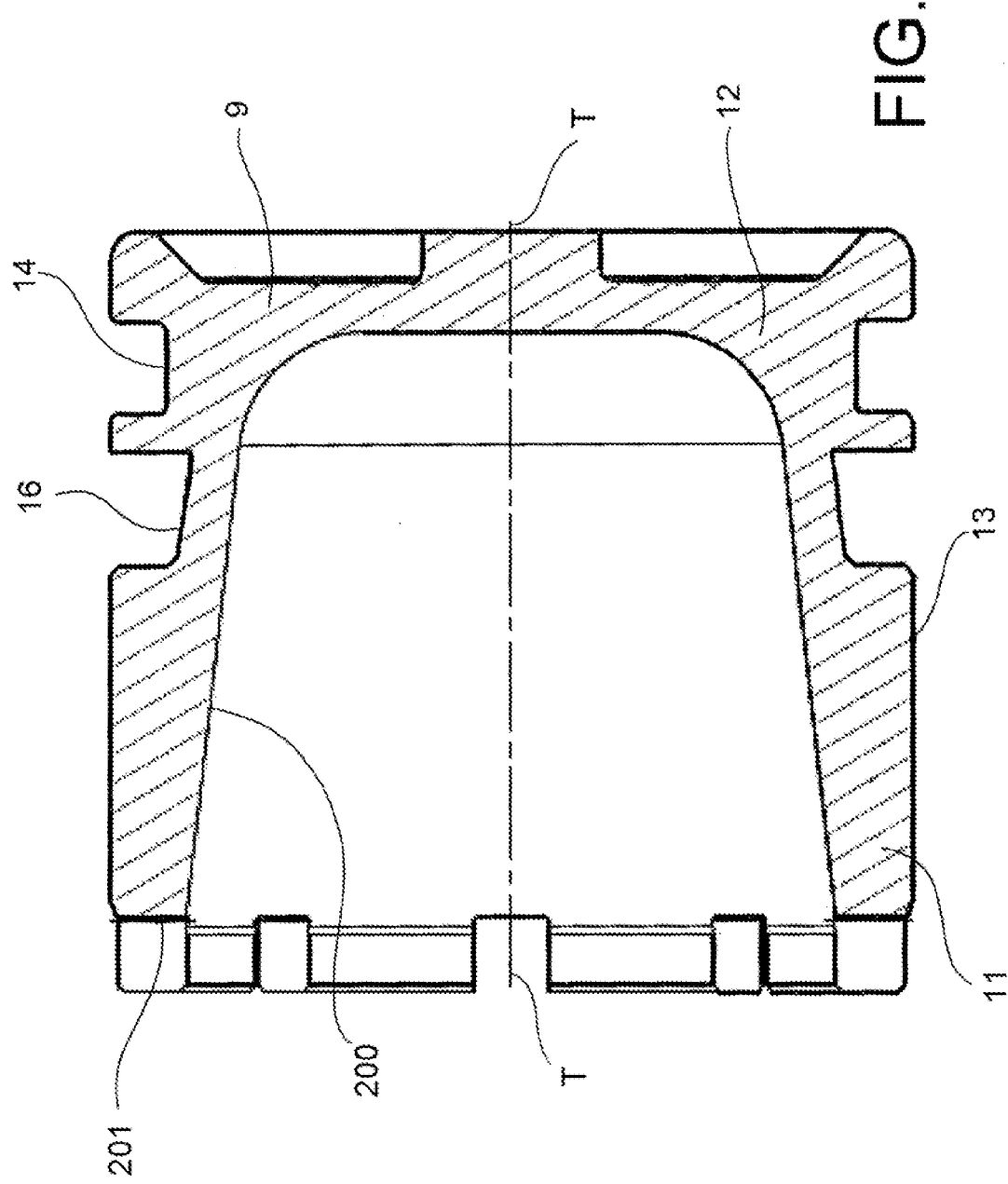
FIG. 17 illustrates—in a cross-section—a piston according to a further embodiment.
Figure 18:
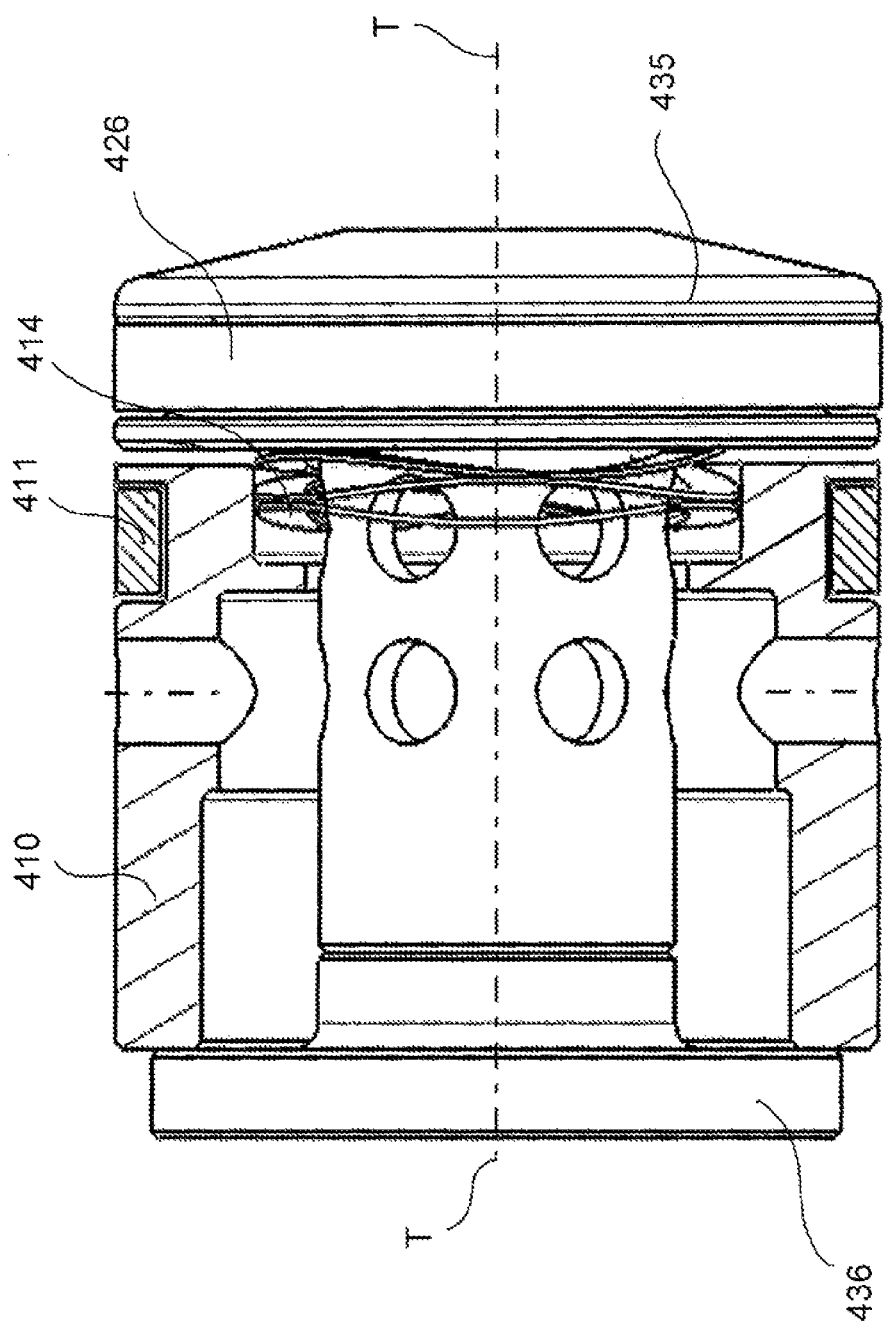
FIG. 18 illustrates—in a cross-section—a piston according to still another further embodiment.
Figure 19:
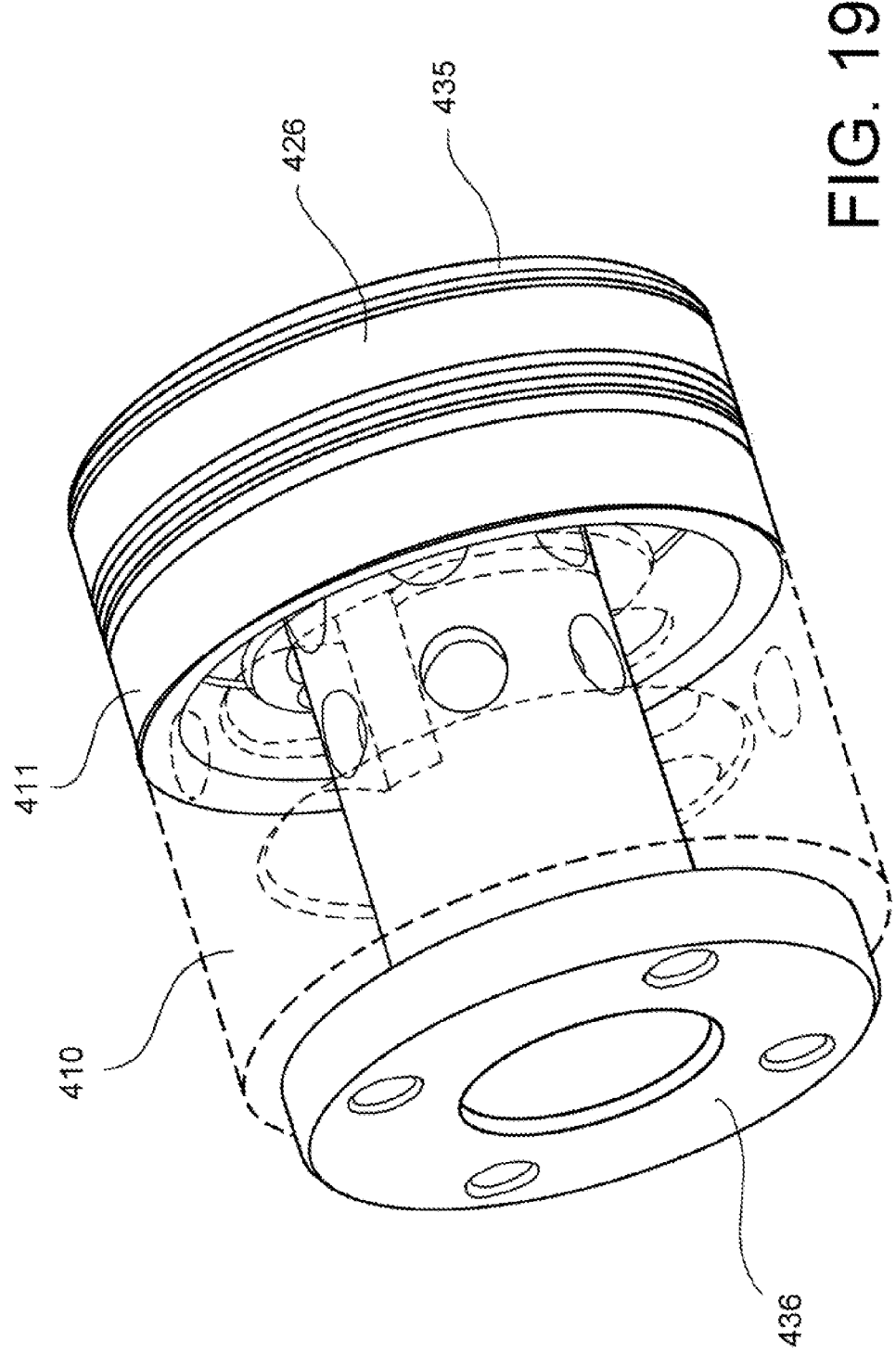
FIG. 19 illustrates—an elevation view with some parts transparent in order to illustrate underlying components—the piston of FIG. 18.
Figure 20:
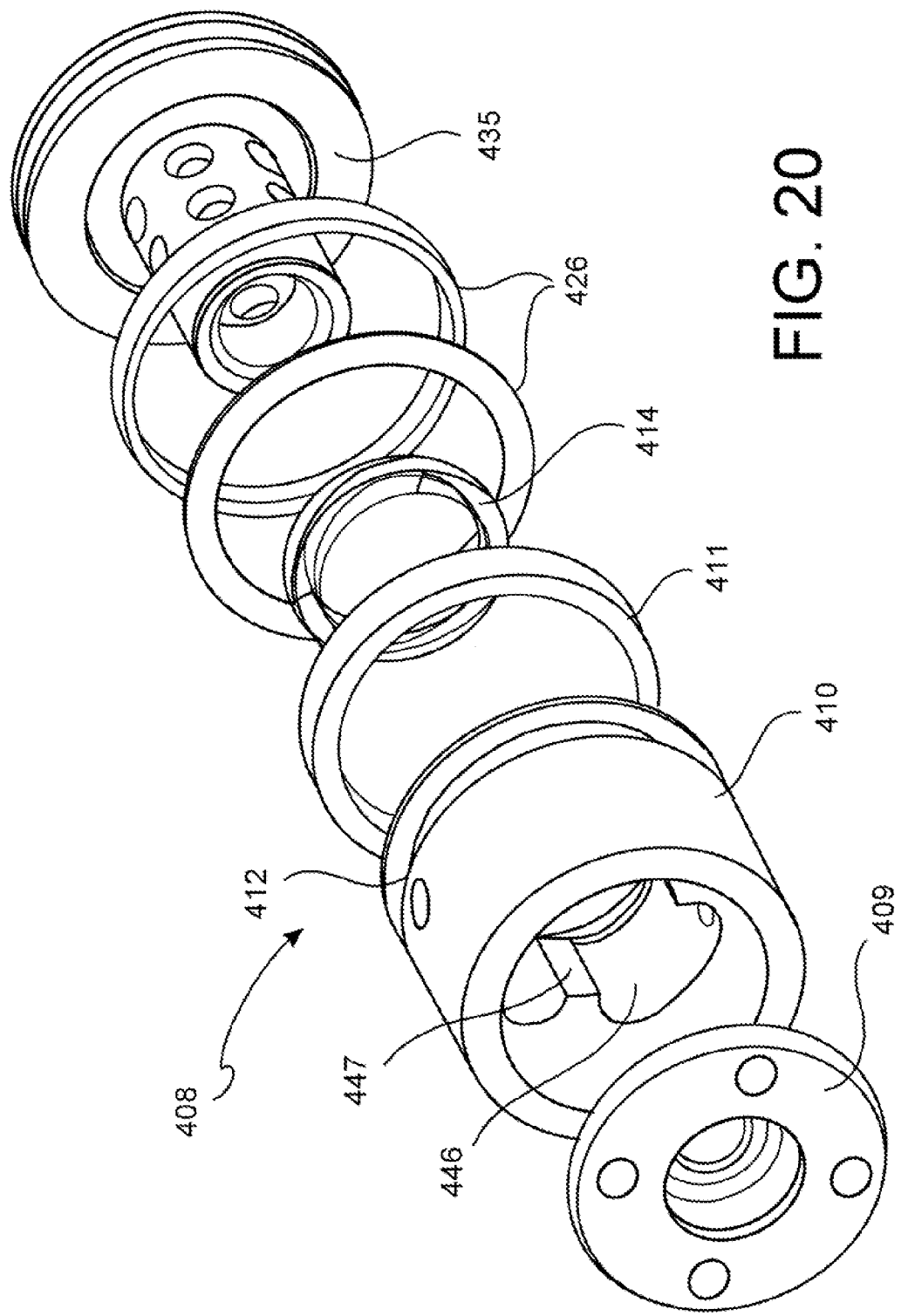
FIGS. 20, 21 and 22 show an elevation or cross-sectional view—the piston of FIG. 18 with parts separated.
Figure 21:
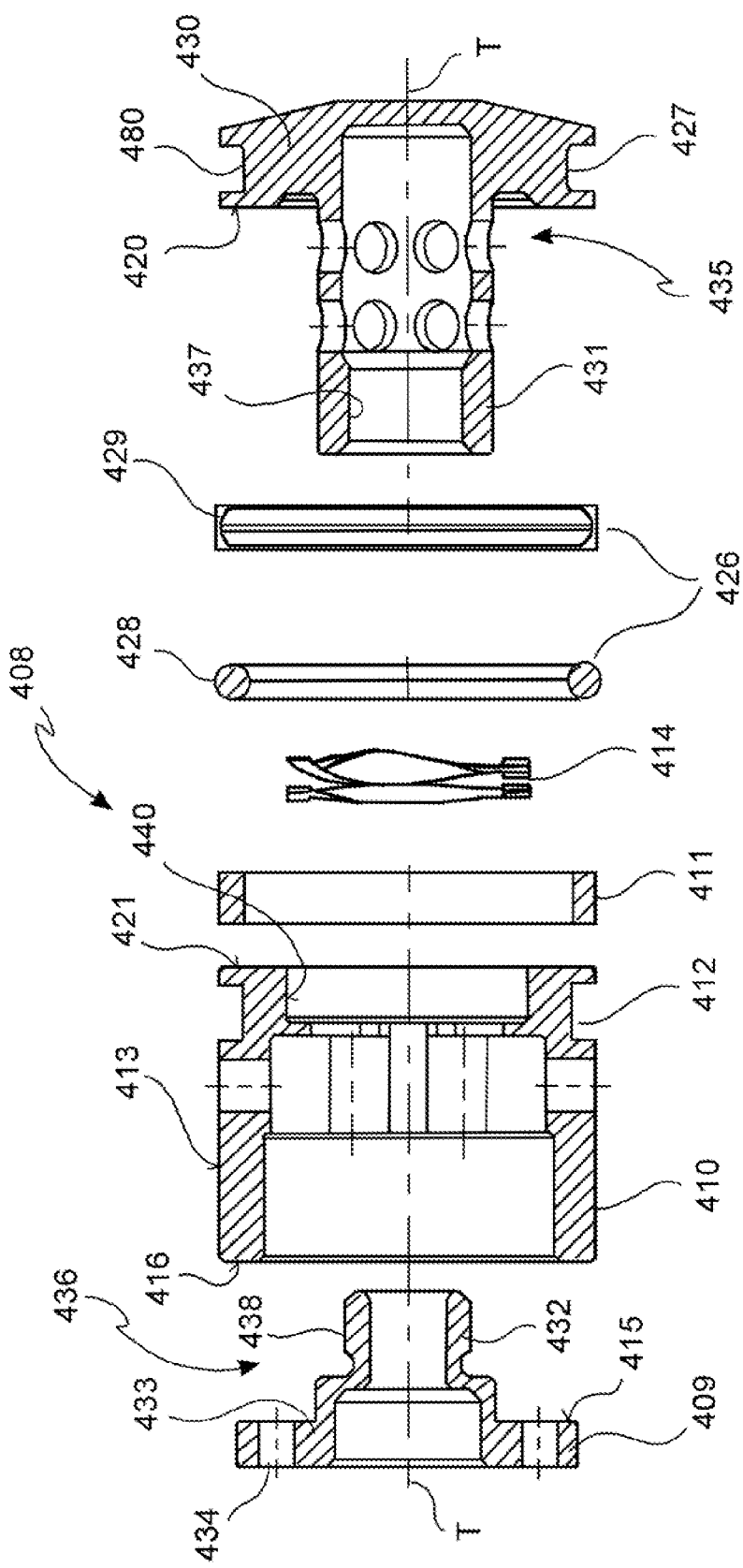
Figure 22:
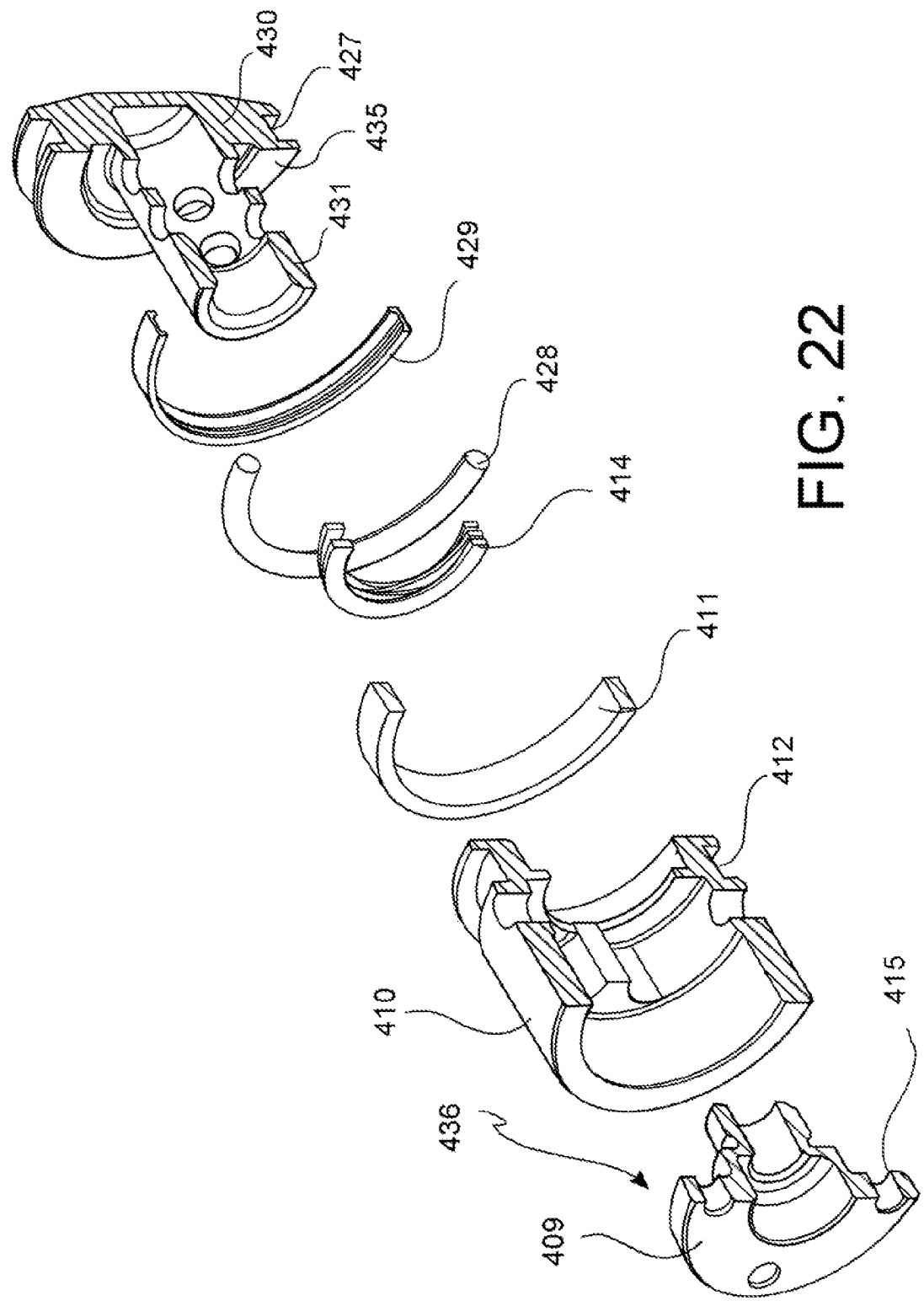
Figure 23:
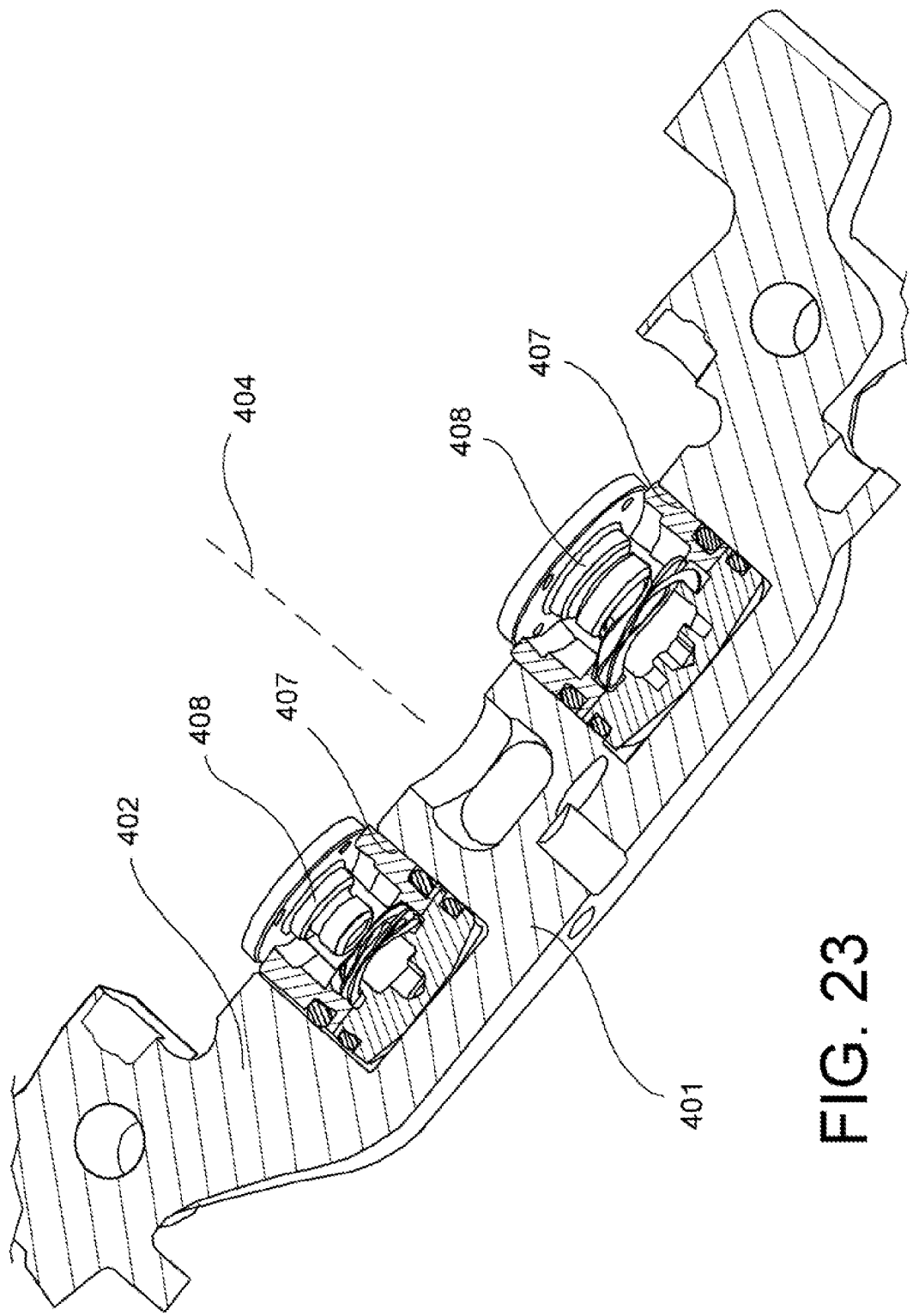
FIG. 23 shows a cross-sectional elevation view of a part of a caliper body which receives two pistons.

Also as observable from FIG. 16, where, due to a test, there is a comparison between the behaviour of a piston according to the prior art (dashed line) and one provided according to the present description (solid line), representing the travel of the brake pedal (or travel of the brake pump) as a function of the pressure of the brake fluid or braking torque, the proposed solution is definitely more rigid (more horizontal line) and thus more prompt and accurate with respect to the prior art solution.

Figure 12A:
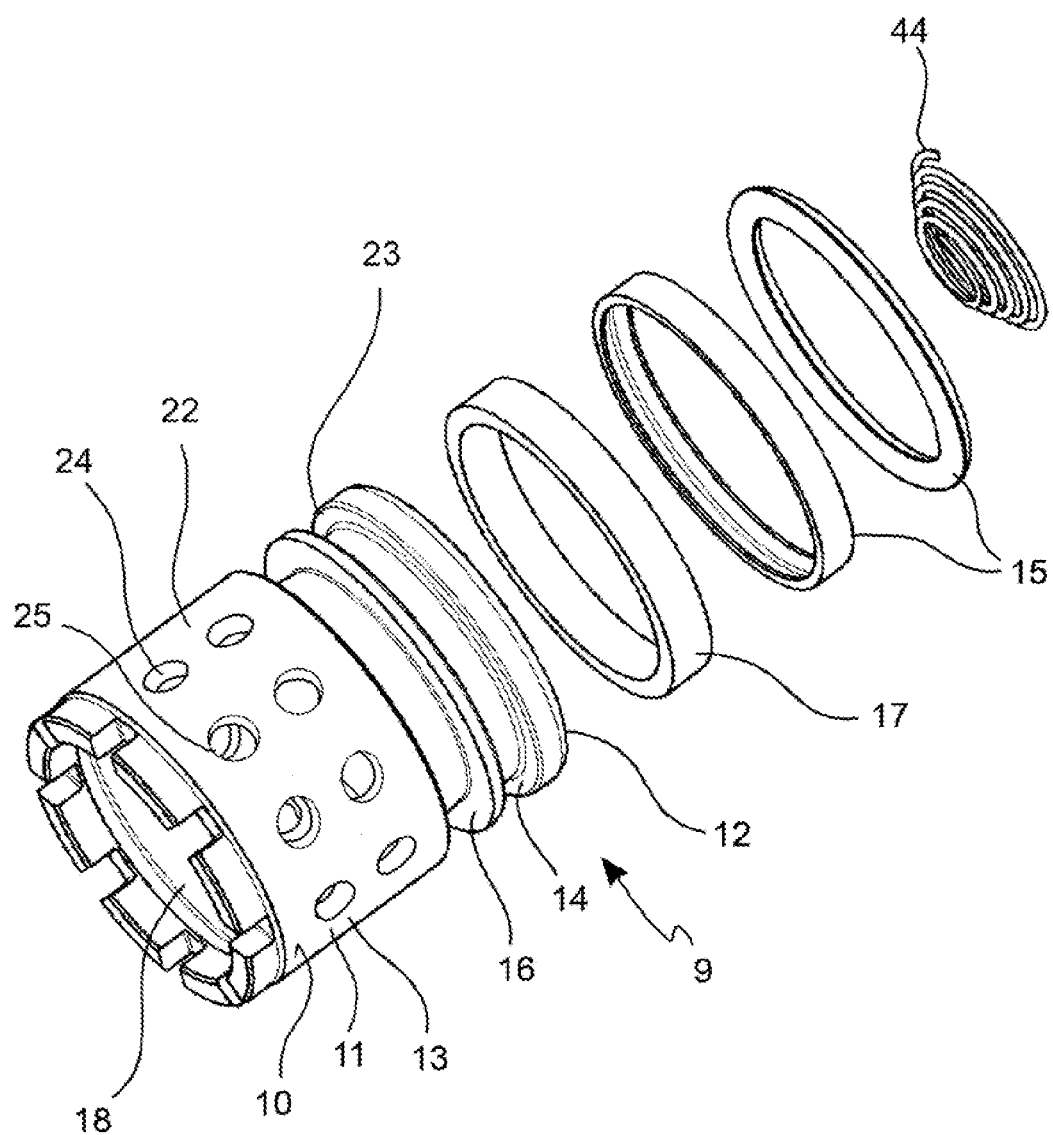
FIG. 12*a* represents an elevation view of a brake caliper piston in a further embodiment with parts separated.
Figure 12B:
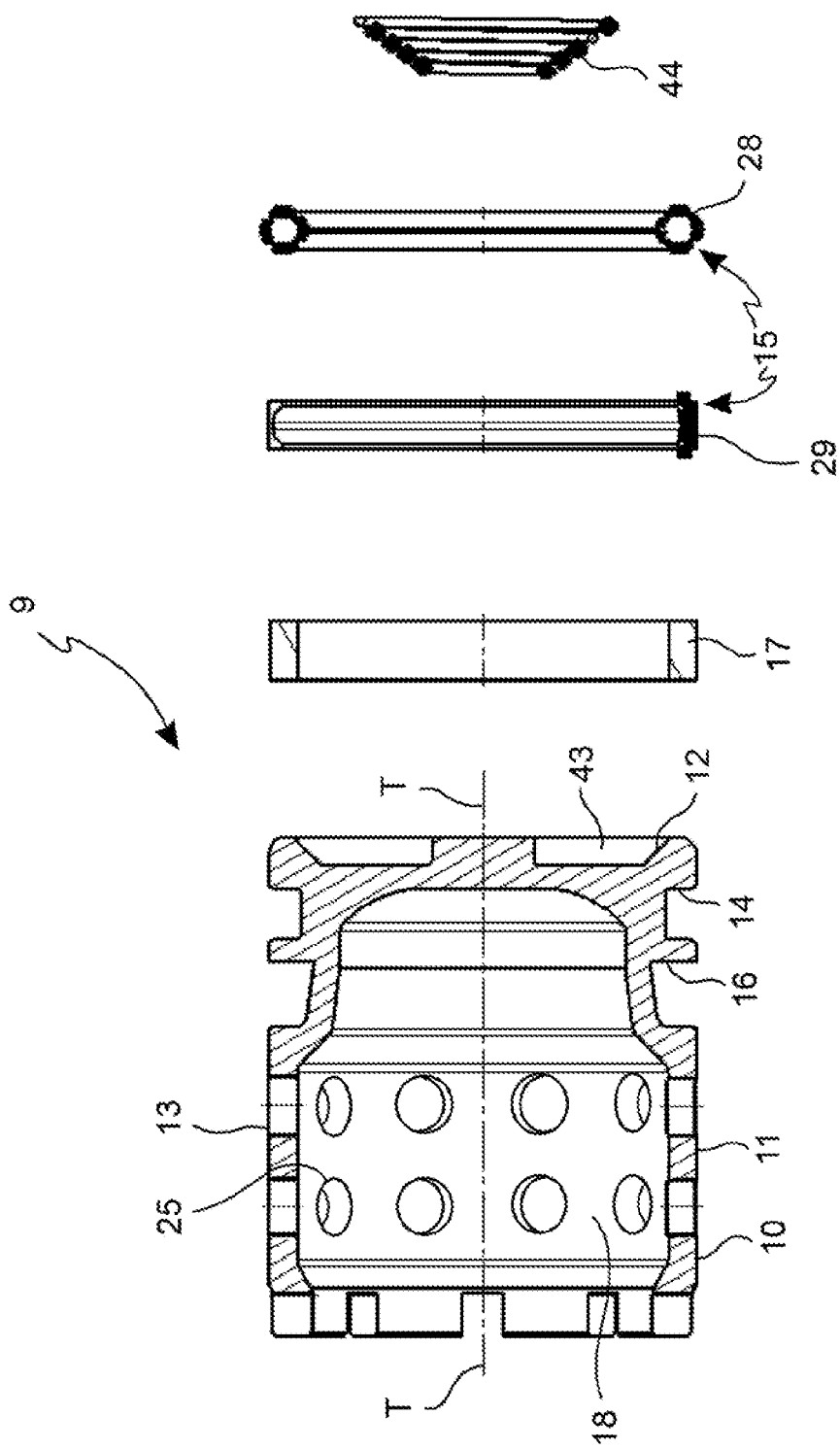
FIG. 12*b* represents a cross-sectional orthogonal view along a plane passing through the piston thrust axis of the piston of FIG. 12.
Figure 12C:
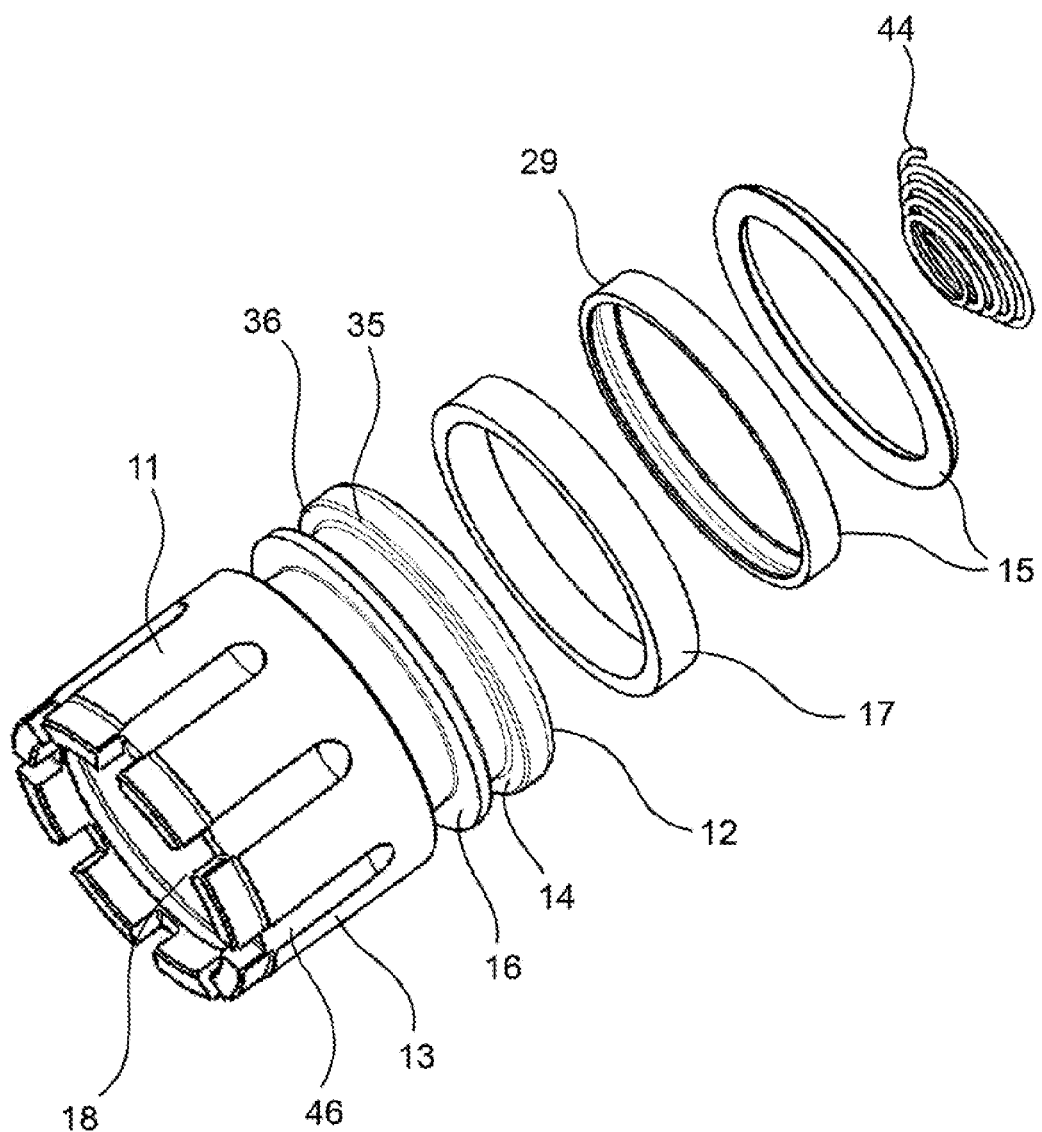
FIG. 12*c* represents an elevation view of a brake caliper piston in still another further embodiment with parts separated.

Providing a piston as shown in any one of the previously described embodiments, allows providing means for lightening the piston body, especially in the portion of the piston body separating the gaskets from the pad, for example as shown in FIGS. 12*a* and 12*b* where for example holes 25 lighten the piston, or in FIG. 12*c* where longitudinal grooves 46, preferably blind, lighten the piston.

The previously described embodiments, simultaneously allow simpler and much more accurate machining operations. For example, the machining of the annular seats on the piston body is much simpler and accurate than the provision of annular seats in the body of the caliper in the piston seat.

Also the much more accurate machining of the seats allows a much more accurate predefinition of the degree of the plastic deformation of the gasket in the direction of the thrust axis, and thus accurately predefining the degree of the piston roll-back.

Providing a first annular seat adapted to receive a sealing gasket between the piston and the piston seat having a shape capable of substantially preventing a plastic deformation of the gasket in the direction of the thrust axis, allows separating the mechanical components which guarantee the sealing of the fluid by the mechanical components intended for enabling the elastic return of the piston into the piston seat, thus optimizing the design and the choice of materials and guaranteeing an even greater accuracy of the roll-back.

Providing a first sealing gasket allows keeping the brake fluid away from the second roll-back gasket, preventing impact thereon by the brake fluid in particular when pressurised, and guaranteeing an even more reliable and repeatable operation.

A lower degree of roll-back and greater accuracy allow guaranteeing an accurate and uniform roll-back of all the pistons possibly provided in the brake caliper thus preventing the occurrence of local residue braking torques, thus guaranteeing a more uniform wear of the pads.

The preferred embodiment of the device described above can be subjected, by a man skilled in the art with the aim of meeting contingent and specific needs, to numerous modifications, adaptations and replacement of elements with other functionally equivalent elements, however without departing from the scope of protection of the claims that follow.

Figure 13:
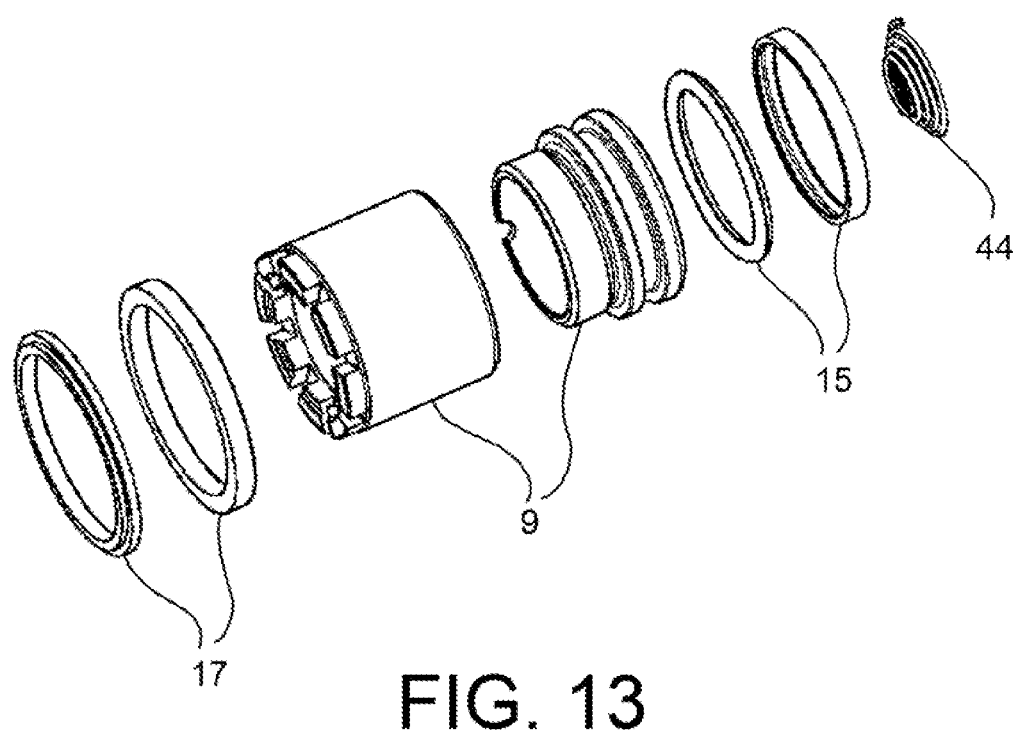
FIG. 13 illustrates an elevation view of a piston according to still another further embodiment with parts separated.
Figure 14:
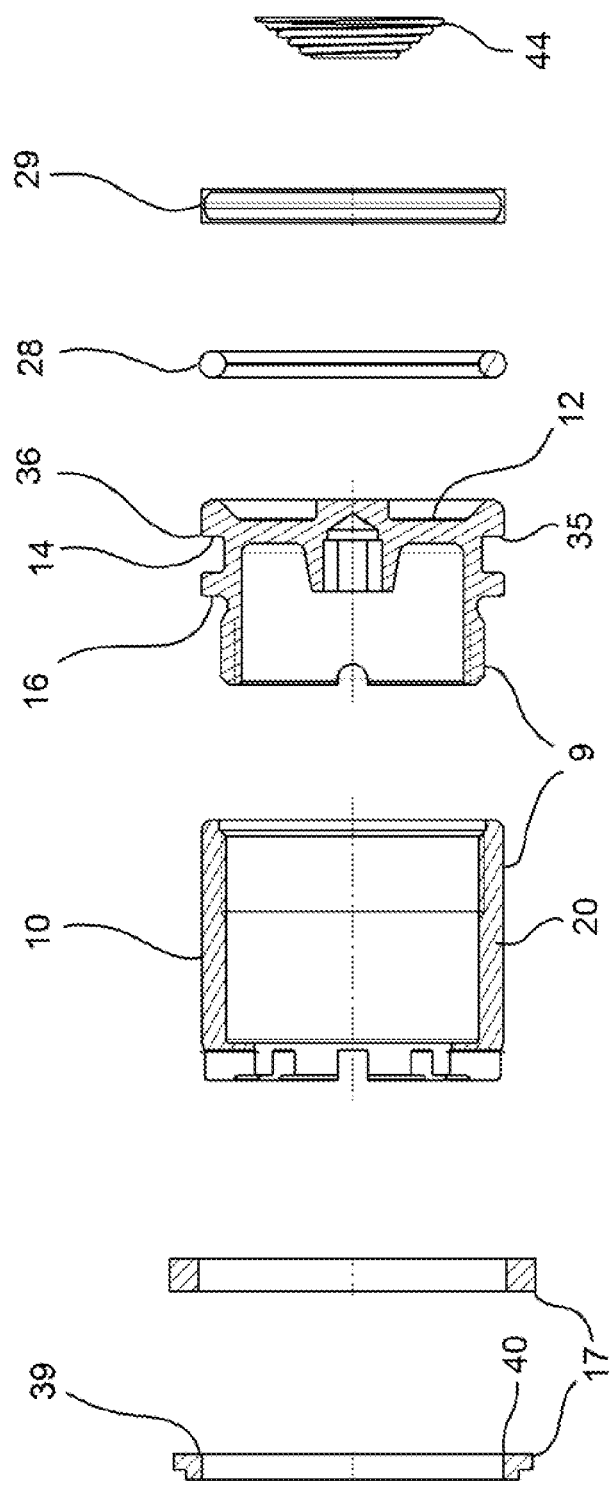
FIG. 14 illustrates the piston of FIG. 13 with parts separated in orthogonal cross-section according to the thrust axis.

As shown in FIGS. 13 and 14, the piston can also be provided in two parts firmly joined to each other. This solution, though not equally accurate with respect to that with the piston in a single body, is however more efficient with respect to the prior art solutions.

According to a further embodiment, the first gasket 15 is received in the first annular seat 14 so that any deformation thereof is prevented in the direction parallel to the thrust axis T-T during the operation of the piston.

According to a further embodiment, said first gasket 15 comprises a retention ring 29 received in said first annular seat 14 so that it is substantially prevented from rotating around to the radial direction R-R and moving along the thrust direction T-T.

According to a further embodiment, said second annular seat 16 defines a volume 38 dimensioned to receive a predefined amount 37 of gasket 17 so as to obtain the roll-back RB of the piston 9 into the piston seat thereof 8 by a predefined desired degree or amount.

According to a further embodiment, between said bottom 12 and said piston seat 8 there is present an elastic element 44 capable of guaranteeing a desired "knock-back" of the piston 9 also considering the possible action of the second gasket 17.

According to still another further embodiment, said piston body 11 internally forms a cavity 200 having a section along a plane passing through the thrust axis T-T substantially bell-shaped, so as to increase the thickness of the wall of the piston body passing from the thrust end 201 to the bottom 12 of the piston. This thickness increasing from the thrust end and the bottom allows increasing the rigidity and the mechanical resistance of the piston body also in cases where seats for deep gaskets are required to be provided, avoiding weakening the wall of the piston.

According to a general embodiment of a brake caliper piston roll-back device, said brake caliper 401 comprises a caliper body 402 arranged astride a brake disc 403 having a rotational axis 404 and opposite friction surfaces 405. The brake caliper 401 receives pads 406 in the caliper body 402 so as to allow sliding thereof in direction axial to the brake disc 403 and an action thereof on said opposite friction surfaces 405.

Said caliper body 402 further comprises at least one piston seat 407 adapted to sealingly receive a piston 408 adapted to impact at least one of said pads 406 against said friction surfaces 405 of the brake disc 403, when said piston 408 is pressed towards said pad.

Advantageously, said piston 408 comprises a piston body 409 and a sleeve 410 arranged coaxial outside said piston body 409.

Preferably, a scraper element 411, adapted to cooperate with the piston seat, is received in a seat 412 provided in the piston which substantially prevents deformation thereof in the movement direction of the piston or axial direction or thrust direction T-T, during the operation of the piston. According to an embodiment, said scraper element 411 operates as at least one of the components of the piston on the piston seat, alternatively from the piston body 409 or from the sleeve 410, with a pressure adapted to determine a resistance action against the movement of the piston. In other words, the scraper element 411 exerts on a sealing surface 413 of the piston seat, provided in the body caliper, a friction action which is temporarily integral with the scraper at the sealing surface of the piston seat on which it operates until the thrust threshold of the brake fluid is exceeded.

Also provided for are elastic means 414 adapted to elastically impact at least said sleeve and adapted, when pushed by the movement of the piston, to elastically yield up to compression thereof or up to an abutment position of the piston.

Advantageously, said elastic means 414 have a predetermined elastic constant which determines an elastic action on the piston. This elastic action presses the piston 408 returning into the seat thereof and it is easily overcome by the braking action exerted by the pressure of the brake fluid on the piston.

This elastic action of the elastic means 414 is predetermined by a degree and it is substantially lower than the resistance action against the movement exerted by said scraper element 411, so that during the movement of the piston 408 said scraper element 411 enables a relative sliding between itself and the component of the piston on which it operates only after the elastic means reach the maximum compression yield or the component which presses them reaches abutment. In other words, during the action of the brake fluid on the piston 408, the elastic means yield first up to a predetermined value, given by the compression thereof or by a predetermined abutment, and a relative sliding between the scraper and component of the piston on which this scraper operates occurs only later.

According to an embodiment the action of the elastic means 414 is lower than the friction action of the scraper element 411 but even greater than the action of possible further sealing elements 426.

During the relative sliding between the scraper element 411 and the piston seat on which the latter operates, any considerable deformation in the movement direction of the piston, or axial direction, of the scraper element is prevented.

In other words, upon termination of the braking action of the brake fluid, regardless of the roll-back of the piston into the seat thereof due to the elastic means, the scraper element is not subjected to any substantial axial deformation capable of substantially recovering or returning the piston. Still in other words, the scraper element does not participate in the return of the piston into the seat thereof.

According to a general embodiment, said piston 408 has a surface for stopping the returning 415 of the piston pressed by the elastic means 414, said surface being adapted to cooperate with a roll-back abutment surface 416 to limit the return on the piston 408 of the elastic means 414 limiting the roll-back of the piston 408 into the piston seat 407 by a predetermined degree "R" or roll-back.

According to an embodiment, said piston 408 comprises a piston body 409 and a sleeve 410, arranged coaxial to said piston body 409. Said sleeve 410 is arranged outside said piston body 409 and has external sealing surface 413. A scraper element 411 is received in a seat 412 provided in the piston body so as to press against the sealing surface of the piston seat. Said seat 412 of the scraper element is configured so as to substantially prevent an axial deformation of the scraper element during a relative sliding movement between said scraper element 411 and said sealing surface.

A spring 414 is provided between said sleeve 410 and said piston body 409 and it is adapted to elastically and axially impact said sleeve and said piston body mutually moving away from each other. Said spring 414 is adapted, when pressed by the movement of the piston 408, to elastically drop up to compression thereof, i.e. to be pressed up to a condition of maximum compression, or a bring said piston body 409 to a position of abutment against said sleeve 410. Said spring 414 has a predetermined elastic constant which determines an elastic action on the piston 408 substantially lower than the axial friction action exerted by the scraper element 411 so that, when the piston 408 is pressed exiting from the piston seat 407 thereof, the piston body 409 is compressed against said spring 414 or an abutment against said sleeve 410 before there occurs a relative sliding between said scraper element 411 and said sealing surface of the piston seat.

According to an embodiment, said piston body 409 comprises a stop surface 415 adapted to interact with an abutment surface 416 of the sleeve 410 to limit the return of the piston body 409 into the piston seat 407 by a predetermined degree, the return being determined by the action of the elastic means or of the spring 414 upon termination of the pressure of the brake fluid. Advantageously, said scraper element 411 comprises retention means 419 adapted to hold scraper means 411 in the seat 412 preventing axial deformation thereof during the movement of the piston 408.

Advantageously, said scraper means 411 are a gasket. Preferably, said retention means 419 are walls of the seat 412 arranged orthogonal to said piston thrust axis T-T.

Preferably, said retention surface 419 extends until it nears—without contact—the opposite sealing surface of the piston seat 407.

Advantageously, said scraper means 411 are made of EPDM material 80. According to an embodiment, said scraper means 411 are annular-shaped with a rectangular cross-section.

Advantageously, the retention seat 412 of the scraper means 411 has a bottom and at least one lateral wall.

Preferably, said lateral wall of the retention seat 412 of the scraper means extends until it nears—without contact—the opposite sealing surface.

Advantageously, said lateral wall of the retention seat 412 of the scraper means 411 is arranged substantially orthogonal to the surface of action coinciding with the lateral surfaces of the piston seat.

According to an embodiment, the cylinder-piston unit comprises sealing means 426. Said sealing means 426 are received in a second seat 427 provided in the piston 408 and they operate against a lateral surface of the piston seat 407.

Preferably, said seat 427 for the sealing means 426 comprises a groove having part of the bottom and lateral walls substantially arranged orthogonal to the surface on which said sealing means 426 operate. According to an embodiment said bottom wall 480 is arranged parallel to the axial or thrust direction T-T.

Advantageously, said seat 427 is arranged radially at least partly superimposed with a wall of the bottom of the piston body.

According to an embodiment, said sealing means 426 comprise an "o-ring" gasket 428. Advantageously, said sealing means comprise a retention ring 429 having opposite lateral walls slidingly fitted into said seat 427 of the sealing means. Preferably, said retention ring 429 has a surface opposite to the seat thereof, substantially parallel to the surface of the piston seat on which the sealing means 426 operate. Advantageously, said retention ring 429 constitutes a support slide at the surface on which the sealing means operate. Preferably, said retention ring 429 is made of TURCON™ material.

According to an embodiment, the piston 408 has a compression abutment surface 420 adapted to cooperate with an abutment counter-surface upon compression 421 to limit the maximum compression of the elastic means 414 during the extraction of the piston 408 from the seat 407 thereof.

Advantageously, the piston has a stop abutment 415 cooperating with a stop surface 416 to limit the roll-back of the piston 408 into the seat 407 thereof when pressed by the action of the elastic means 414. Preferably, the distance between the maximum compression abutment 420 of the elastic means and the stop abutment 415 upon return of the piston 408 into the seat 407 thereof has a value of predetermined degree. Advantageously, the distance between the maximum compression abutment 420 of the elastic means and the stop abutment 415 upon return of the piston 408 into the seat 407 thereof can be adjusted.

According to an embodiment, the piston body 409 comprises a bottom disc 430 and a bottom cylindrical extension 431, cooperating with the thrust cylindrical extension 432 ending with a thrust element 433.

Advantageously, said bottom cylindrical extension 431 has a predetermined axial extension.

Advantageously, said thrust cylindrical extension 432 has a predetermined axial extension.

According to an embodiment, said thrust element 433 comprises a pads support ring.

Preferably, said thrust element comprises a radiator body. Advantageously, said thrust element 433 comprises means for the passage of cooling air and/or seats 434 for manoeuvring the piston 408 and the pads 406.

According to an embodiment, said piston body comprises at least two components: a bottom body 435 and a pads support body or thrust body 436.

Advantageously, said bottom body 435 comprises a bottom disc 430 and a bottom cylindrical extension 431, as well as adjustable connection means 437.

Advantageously, said pads support body 436 comprises a pads support element or thrust element 433 and a thrust cylindrical extension 432, as well as connection counter-means 438.

Preferably, said connection means 437 and connection counter-means 438 comprise threaded portions for an adjustable threaded connection.

According to an embodiment, spacers 439, for example calibrated, are provided between said bottom body 435 and said thrust body 436 to adjust the mutual distance thereof.

According to still another further embodiment, said bottom cylindrical extension 431 is connected to said thrust cylindrical extension 432 so as to adjust the distance between the compression abutment 420 of the elastic means 414 and the piston stop surface 415. Advantageously, said sleeve 410 is received between said bottom disc 430 and said thrust element 433.

Preferably, said sleeve 410 has a predetermined axial extension.

Advantageously, a first end of the sleeve 410 comprises an abutment surface 416 adapted to cooperate with the piston stop surface 415.

With further advantage, a second end of the sleeve 410 comprises an abutment counter-surface 421 upon compression of the elastic means adapted to cooperate with the compression abutment 420 of the elastic means 414 of the piston 408.

According to an embodiment, said sleeve comprises a seat 440 adapted to receive elastic means 414.

Advantageously, said seat 440 is comprised in the end of the sleeve 410 opposite to the pads 406.

Preferably, said sleeve 410 comprises an undercut seat 440 for the elastic means 14 and an extension comprising at the end thereof an abutment counter-surface 421 to limit the compression of the elastic means 414.

According to an embodiment, a brake caliper 401 comprises at least two devices for adjusting the roll-back of cylinder-piston units arranged therebetween at opposite positions.

According to still another further embodiment, a caliper comprises a caliper body having a portion extended on the hub side 443 adapted to face the side of a brake disc 403 facing towards the hub of a vehicle, a portion extended to the wheel side 444 adapted to face the side of the brake disc 403 facing towards the wheel of the vehicle and at least two end bridges 445 adapted to connect the ends of said portions extended to the hub side 443 and wheel side 444.

Advantageously, the portions extended to the hub side 443 and wheel side 444 and the at least two end bridges 445 are made in a single piece.

According to an embodiment, a sleeve 410 has discharge or longitudinal lightening element 446.

According to an embodiment, said bottom cylindrical extension 431 has lightening holes arranged longitudinally.

According to an embodiment, a sleeve 410 is internally provided with lightening axial elements 446.

Advantageously, crests 447 inside the walls delimiting said lightening cavities 446 form a surface for guiding the sleeve 410.

According to an embodiment, said thrust element 433 of the piston 408 adapted to operate on the pad comprises a disc-shaped element provided with radial arms. Advantageously, said radial arms are joined to each other.

According to still another further embodiment, said piston 408 is pressed in advancement exiting from the seat 407 thereof by gear-motor means. Advantageously, said gear-motor means comprise an electric motor.

An operation mode of a caliper comprising a piston roll-back device is shown below.

Applying pressure to the piston body, for example by increasing the pressure exerted by the brake fluid introduced into the chamber delimited between the piston seat or cylinder and the piston body, causes partial exit of the piston body from the seat thereof.

The elastic means constantly apply an elastic return action on the piston body, such action being adapted to impact it constantly returning into the seat thereof. During the movement of extraction of the piston from the seat thereof, given that the scraper element is held into the seat thereof so that, when pressed, it is not subjected to any axial deformation and given that this scraper element applies pressure on a sealing surface of the piston seat adapted to exert a scraping action and an axial friction action substantially greater than said elastic return action of the elastic means, when the piston body exits, the elastic return action is overcome without said scraper element being subjected to any substantial axial deformation and a relative sliding between said scraper element and said sealing surface are avoided initially until said elastic means are compressed or said piston reaches an abutment surface, before allowing a relative sliding between said scraper element and said sealing surface of the piston so as to allow a pressure of the pad on the braking surface of the disc to exert the desired braking action and possibly to compensate the wear of the brake pad.

Upon terminating the desired braking action, the pressure exerted on the piston body by the brake fluid is released and, through the elastic action of the elastic means, it is returned to the piston body or into the seat thereof provided in the caliper.

According to a particular operating mode, the return of the piston body is stopped against an abutment so as to have a defined degree of travel of return of the piston into the caliper.

The proposed device enables obtaining a particular prompt braking and an accurate control of the return of the piston or roll-back at the same time.

In particular, the device has a particularly high operation repeatability.

The description above allows understanding how it is particularly easy to adjust a brake caliper so that it has a desired roll-back even in operating conditions quite different from each other. This even allows differently adjusting different devices present in the same caliper or in the callipers of the same motor vehicle, so as to have a more efficient behaviour of the entire braking system.

The invention claimed is:

1. A disc brake caliper comprising a caliper body arranged astride a brake disc having a rotational axis defining an axial direction (X-X) and opposite friction surfaces, said caliper comprising pads received in said caliper body so as to be slidable substantially in direction (X-X) axial to the brake disc to respectively operate on said opposite friction surfaces, said caliper body comprising at least one piston seat adapted to receive a piston provided with a lateral surface adapted to slide in said piston seat so as to be forced by pressurized brake fluid exiting from said seat to impact at least one of said pads against one of said friction surfaces of the brake disc, wherein:

said piston has a substantially cylindrical-shaped piston body having a thrust axis (T-T) substantially parallel to the rotational axis (X-X) of the disc and having a radial direction (R-R) perpendicular to said thrust axis (T-T);
said piston body having a bottom and a cylindrical wall;
said piston body having a first annular seat provided in said cylindrical wall;
said first annular seat being adapted to receive a first gasket;
said piston body having a second annular seat arranged in said cylindrical wall;
said second seat being different from said first seat;
said second annular seat having a shape adapted for a controlled elastic deformation of a second gasket received in said second annular seat;
said second annular seat being in proximity to an edge nearest the bottom of the piston body comprising a portion that is rounded to define a boundary which defines a volume adapted to receive a gasket portion during elastic deformation thereof determined by the movement of the piston exiting from the piston seat;
said second gasket operating between said piston and said piston seat and being adapted to be deformed elastically in the direction of the thrust axis (T-T) during relative movement of the piston with respect to the piston seat so as to be preloaded elastically to return the piston into the piston seat by a predetermined degree or roll-back upon termination of the braking action, and wherein:

said first annular seat is at least partly radially superimposed on said bottom;
said first annular seat having a substantially square-shaped cross-section with lateral walls transverse to the thrust direction (T-T) and a bottom substantially parallel to said thrust direction (T-T) to receive said first gasket in order not to deform in the thrust direction (T-T) during the relative movement of the piston with respect to the piston seat;
said second seat receiving said second gasket being arranged on the side opposite from the bottom with respect to said first seat receiving said first gasket, and nearer the pads than said first seat;
said first gasket operating between said piston and said piston seat so as to provide a fluid sealing capable of allowing pressurization of the fluid, the first sealing gasket keeping the brake fluid away from the second gasket;
said first gasket comprising:
a retention ring having a surface, opposite to an annular seat, providing a fluid sealing by acting as a scraper with an inner sliding surface of the piston seat, said retention ring having a radially inner surface facing radially inside the piston and having an annular groove; and
an underlying gasket partly received in said annular groove of said radially inner surface of the retention ring and prevented by said radially inner surface of the retention ring from deforming in the thrust direction (T-T).

2. The caliper of claim 1, wherein said piston body comprises an internally hollow portion having dimensions perpendicular to the thrust axis (T-T) wherein the dimensions of the hollow portions increase in proportion to the distance away from said bottom.

3. The caliper of claim 1, wherein said hollow portion comprises two portions wherein the portion near the bottom has a smaller dimension perpendicular to the thrust axis (T-T) with respect to the second portion.

4. The caliper of claim 1, wherein said cylindrical wall has a substantially constant radial thickness.

5. The caliper of claim 1, wherein said cylindrical wall comprises two portions wherein the first portion serves as a spacer between the pad and said annular seats while the second portion is arranged farther from the pad to create a structure adapted to receive the gaskets.

6. The caliper of claim 1, wherein a first portion of the cylindrical wall comprises lightening means.

7. The caliper of claim 1, wherein a first portion of the cylindrical wall comprises lightening holes.

8. The caliper of claim 1, wherein said second annular seat is arranged in a portion of the cylindrical wall superimposed on a second portion of a hollow portion having a smaller diameter with respect to a remaining first portion of the hollow portion.

9. The caliper of claim 1, wherein said first annular seat comprises two lateral faces arranged perpendicular to the thrust direction (T-T).

10. The caliper of claim 1, wherein said underlying gasket of the first gasket is an "o-ring" gasket coupled to said retention ring, both of which are received in said first annular seat, and wherein said retention ring comprises opposite lateral walls cooperating with lateral faces of said first annular seat.

11. The caliper of claim 1, wherein said second gasket comprises a substantially quadrangular-shaped cross-section.

12. The caliper of claim 1, wherein said second annular seat comprises in proximity to the edge, farthest from the bottom of the piston body, a second portion that is rounded to define a boundary suitable to cause a knock back volume to receive a portion of a gasket during elastic deformation thereof determined by the movement of the piston withdrawing into the piston seat thereof or wherein said second annular seat defines a knock back volume dimensioned to receive a predetermined portion of a gasket so as to obtain a predetermined "knock-back".

13. The caliper of claim 1, wherein said bottom of the piston body comprises a bottom seat adapted to receive an elastic element which operates between the piston and the piston seat according to the thrust direction (T-T).

14. The caliper of claim 1, wherein said bottom comprises a bottom seat configured to enable the correct centering of said elastic element.

15. The caliper of claim 1, wherein between said bottom and said piston seat a spring is present capable of an elastic constant substantially constant over the entire travel of exit of the piston from the piston seat.

16. The caliper of claim 1, wherein said second annular seat is spaced from said first annular seat by a distance equal to or less than the width of said first seat with respect to the thrust direction (T-T).

17. The caliper of claim 1, wherein said second annular seat is spaced from said first annular seat by a distance equal to or less than the width of said second seat with respect to the thrust direction (T-T).

18. The caliper of claim 1, wherein said second annular seat defines a volume dimensioned to receive a predefined amount of gasket so as to obtain the roll-back of the piston into the piston seat thereof by a predefined desired degree or amount.

19. The caliper of claim 1, wherein said piston body of said piston is a single piece.

20. The caliper of claim 1, wherein said second annular seat receives a gasket operating between said piston and said piston seat and adapted to be deformed elastically in the direction of the thrust axis (T-T) adapting to said second annular seat during the relative movement of the piston with respect to the piston seat so as to be preloaded elastically and return the piston into the piston seat by a predetermined degree or roll-back upon termination of the braking action.

21. The caliper of claim 1, wherein said piston body forms an internal cavity having a section along a plane passing through the thrust axis (T-T) and which is substantially bell-shaped, so as to increase the thickness of the wall of the piston body passing from the thrust end to the bottom of the piston.

* * * * *